US011758562B2

(12) United States Patent
Asterjadhi et al.

(10) Patent No.: US 11,758,562 B2
(45) Date of Patent: *Sep. 12, 2023

(54) SUPPORTING 320 MHZ OPERATING BW

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,677

(22) Filed: Oct. 18, 2021

(65) Prior Publication Data

US 2022/0039086 A1   Feb. 3, 2022

Related U.S. Application Data

(63) Continuation of application No. 16/503,464, filed on Jul. 3, 2019, now Pat. No. 11,160,084.

(Continued)

(51) Int. Cl.
*H04W 72/04* (2023.01)
*H04W 72/51* (2023.01)
(Continued)

(52) U.S. Cl.
CPC ........... *H04W 72/51* (2023.01); *H04W 72/23* (2023.01); *H04W 84/12* (2013.01)

(58) Field of Classification Search
CPC ....... H04L 5/00; H04L 5/0007; H04L 5/0094; H04L 27/26; H04L 27/2602; H04W 72/04;
(Continued)

(56) References Cited

U.S. PATENT DOCUMENTS 9,986,566 B2    5/2018  Huang et al.
10,206,230 B2   2/2019  Park et al.
(Continued)

FOREIGN PATENT DOCUMENTS

| CN | 105164939 A | | 12/2015 |
|---|---|---|---|
| WO | WO 2018/048474 | * | 3/2018 |
| WO | WO-2018084034 A1 | | 5/2018 |

OTHER PUBLICATIONS

"Frame Formats", IEEE Draft; TGAX_CL 09, IEEE-Sa, Piscataway, NJ USA, vol. 802.11ax drafts, No. D3.0, Jun. 1, 2018 (Jun. 1, 2018), pp. 1-150, XP068137584, Retrieved from the Internet:URL:www.ieee802.org/11/private/Draft_Standards/11ax/TGax_CI_09.rtf [retrieved on Jun. 1, 2018], figures 9-15i, p. 9, lines 7-12, p. 16, lines 5-15, p. 52; tables 9-31,9-32, p. 89; tables 9-262k1, p. 102: tables 9-262aa.

(Continued)

*Primary Examiner* — Frank Duong
(74) *Attorney, Agent, or Firm* — Holland & Hart/Qualcomm

(57) ABSTRACT

This disclosure provides methods, devices, and techniques to indicate operations by extremely high throughput (EHT) devices on an operating bandwidth, including devices in a basic service set (BSS) supporting the use of a 320 MHz channel. In some aspects, the supported functionality may include extensions to flexibility and support rules, structures, and signaling using legacy fields, frames, and features. In addition, the supported functionality may include channel sensing and reporting, such as per-channel network allocation vectors (NAVs) for the sub-channels of the operating bandwidth. A device may identify an operating mode for an operating bandwidth and determine a value for a bandwidth query report (BQR) or a target wake time (TWT) element. The device may check multiple NAVs for sub-channels of the operating bandwidth. The operating bandwidth may span (Continued)

concurrent operations on traditional Wi-Fi frequency bands including the 2.4 and 5 GHz bands as well as the 6 GHz band.

30 Claims, 27 Drawing Sheets

Related U.S. Application Data

(60) Provisional application No. 62/694,425, filed on Jul. 5, 2018, provisional application No. 62/694,430, filed on Jul. 5, 2018.

(51) Int. Cl.
*H04W 72/23* (2023.01)
*H04W 84/12* (2009.01)

(58) Field of Classification Search
CPC . H04W 72/048; H04W 72/042; H04W 84/12; H04W 28/20; H04W 74/0816
See application file for complete search history.

(56) References Cited

U.S. PATENT DOCUMENTS

| | | | |
|---|---|---|---|
| 10,225,843 B2 | 3/2019 | Park et al. | |
| 10,257,833 B2 | 4/2019 | Huang et al. | |
| 10,375,679 B2 * | 8/2019 | Chu | H04L 27/2602 |
| 10,499,379 B2 | 12/2019 | Lan et al. | |
| 10,567,047 B2 | 2/2020 | Son et al. | |
| 2015/0319782 A1 | 11/2015 | Chu et al. | |
| 2016/0219522 A1 | 7/2016 | Asterjadhi et al. | |
| 2016/0315738 A1 * | 10/2016 | Huang | H04W 74/0816 |
| 2018/0132228 A1 * | 5/2018 | Lan | H04W 74/06 |
| 2019/0174410 A1 | 6/2019 | Seok et al. | |
| 2019/0361108 A1 | 11/2019 | Jiang et al. | |
| 2020/0015219 A1 | 1/2020 | Asterjadhi et al. | |
| 2021/0105667 A1 | 4/2021 | Li et al. | |
| 2021/0153125 A1 * | 5/2021 | Cariou | H04W 52/0235 |
| 2021/0168864 A1 | 6/2021 | Seok et al. | |
| 2021/0176643 A1 | 6/2021 | Jang et al. | |
| 2022/0110154 A1 * | 4/2022 | Lou | H04W 72/121 |

OTHER PUBLICATIONS

International Search Report and Written Opinion—PCT/US2019/040731—ISA/EPO—dated Sep. 23, 2019.
Li (Huawei) Y., et al., "BQR for 320M Hz", IEEE 802.11-20/0712r1 (Apr. 2020), May 1, 2020, 9 pages.
Lan Z., et al., "MAC Support for Preamble Puncture Mode", IEEE 802.11-16/1383-r1, Nov. 2, 2016, pp. 1-6, Tables 9-xx, 9-25a, Figs. 9 to 15h, Chapters 9.3.1.23.5 and 25.5.1.3.
Taiwan Search Report—TW108123658—TIPO—dated Jan. 17, 2023.

* cited by examiner

| Bit | Description |
|---|---|
| 0 | 0-40 MHz |
| 1 | 41-80 MHz |
| 2 | 81-120 MHz |
| 3 | 121-160 MHz |
| 4 | 161-200 MHz |
| 5 | 201-240 MHz |
| 6 | 241-280 MHz |
| 7 | 281-320 MHz |

| Bit | Description |
|---|---|
| 0 | 0-20 MHz |
| 1 | 21-40 MHz |
| 2 | 41-60 MHz |
| 3 | 61-80 MHz |
| 4 | 81-140 MHz |
| 5 | 141-200 MHz |
| 6 | 201-260 MHz |
| 7 | 261-320 MHz |

| Bit | Description |
|---|---|
| 0 | 0-40 MHz |
| 1 | 41-80 MHz |
| 2 | 81-120 MHz |
| 3 | 121-160 MHz |
| 4 | 161-200 MHz |
| 5 | 201-240 MHz |
| 6 | 241-280 MHz |
| 7 | 281-320 MHz |

| Bit | Description |
|---|---|
| 0 | 0-20 MHz |
| 1 | 21-40 MHz |
| 2 | 41-60 MHz |
| 3 | 61-80 MHz |
| 4 | 81-140 MHz |
| 5 | 141-200 MHz |
| 6 | 201-260 MHz |
| 7 | 261-320 MHz |

SUPPORTING 320 MHZ OPERATING BW

CROSS REFERENCE

The present Application for Patent is a Continuation of U.S. patent application Ser. No. 16/503,464 by ASTERJADHI, et al., entitled "SUPPORTING 320 MHZ OPERATING BW" filed Jul. 3, 2019, which claims the benefit of U.S. Provisional Patent Application No. 62/694,425 by ASTERJADHI, et al., entitled "SUPPORTING 320 MHZ OPERATING BW," filed Jul. 5, 2018, and the benefit of U.S. Provisional Patent Application No. 62/694,430 by CHERIAN, et al., entitled "PER-CHANNEL NAV WHEN OPERATING A LARGE BW BSS," filed Jul. 5, 2018, assigned to the assignee hereof, and expressly incorporated herein.

TECHNICAL FIELD

This disclosure relates to wireless communications, and more specifically, to features for enhancing flexibility and supporting functionality for extremely high throughput (EHT) operations, channel sensing, and reporting based on legacy structures.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the 802.11 family of standards is a Basic Service Set (BSS), which is managed by an AP. Each BSS is identified by a service set identifier (SSID) that is advertised by the AP. An AP periodically broadcasts beacon frames to enable any STAs within wireless range of the AP to establish or maintain a communication link with the WLAN. In a typical WLAN, each STA may be associated with only one AP at a time. To identify an AP with which to associate, a STA is configured to perform scans on the wireless channels of each of one or more frequency bands (for example, the 2.4 GHz band or the 5 GHz band). As a result of the increasing ubiquity of wireless networks, a STA may have the opportunity to select one of many WLANs within range of the STA or select among multiple APs that together form an extremely BSS. After association with an AP, a STA also may be configured to periodically scan its surroundings to find a more suitable AP with which to associate. For example, a STA that is moving relative to its associated AP may perform a "roaming" scan to find an AP having more desirable network characteristics such as a greater received signal strength indicator (RSSI).

Wireless communication systems are widely deployed to provide various types of communication content such as voice, video, packet data, messaging, broadcast, and so on. These systems may be multiple-access systems capable of supporting communication with multiple users by sharing the available system resources (for example, time, frequency, and space). The AP may be coupled to a network, such as the Internet, and may enable a station to communicate via the network including communicating with other devices coupled to the AP.

Some wireless devices in a WLAN (such as, APs or STAs) may be configured for extremely high throughput (EHT) operations and supported functionality on a dynamic channel bandwidth spectrum. The dynamic channel bandwidth spectrum may be a portion of spectrum that includes frequency bands traditionally used by Wi-Fi technology, such as the 5 GHz band, the 2.4 GHz band, the 60 GHz band, the 3.6 GHz band, and the 900 MHz band. The spectrum may also include other frequency bands (such as the 6 GHz band). The wireless connection between an AP and STA may be referred to as a channel or link. Each band (for example, the 5 GHz band) may contain multiple channels (for example, each spanning 20 MHz in frequency, 40 MHz in frequency, or 80 MHz in frequency), each of which may be usable by an AP or STA. Based on the functionality supported by EHT modes of operation, flexibility and extensions to existing fields, frames and structuring, signaling, and features associated with operability in utilizing wireless resources may be desired.

SUMMARY

The described techniques relate to improved methods, systems, devices, or apparatuses that support an extended operating bandwidth, for example, a 320 MHz operating bandwidth. In some examples, the described techniques provide for extensions to flexibility and support for rules, structure, and signaling on wireless connections between an access point (AP) and stations (STAs), including existing fields, frames, and features. In other examples, the described techniques provide for extensions support rules, structure, and signaling associated with medium sensing and reporting mechanisms for STAs on channels of a basic service set (BSS) bandwidth managed by an AP (for example, an operating bandwidth). An AP or STA may be configured for enhanced operability (for example, extremely high throughput (EHT)) and enable the extensions to legacy structures to provide increased flexibility in EHT environments. Based on modes of operation, an enhanced operability AP or STA may support broadened operating bandwidth relative to legacy device operation or operation within primary or secondary channel bandwidth spectrum. The operating bandwidth may be contiguous or span one or more disparate sub-channel sets. In some examples, described techniques may provide flexible enhancements to reporting mechanisms or subfield indications signaled by an AP or STA, for increased granularity for channel bitmap or operating bandwidth indication. In other examples, described techniques may provide flexible enhancements to reporting mechanisms or carrier signaling procedures by an STA, for increased granularity for medium sensing or signal quality indication on an operating bandwidth.

The systems, methods and devices of this disclosure each have several innovative aspects, no single one of which is solely responsible for the desirable attributes disclosed herein.

A method of wireless communication at a station is described. The method may include identifying an operating mode for an operating bandwidth of the station, determining, based on the identified operating mode, a value for a parameter of a bandwidth query report (BQR) or a target wake time (TWT) element, and transmitting the BQR or the TWT element including an indication of the determined value for the parameter.

An apparatus for wireless communication at a station is described. The apparatus may include a processor, memory in electronic communication with the processor, and instructions stored in the memory. The instructions may be executable by the processor to cause the apparatus to identify an operating mode for an operating bandwidth of the station, determine, based on the identified operating mode, a value for a parameter of a bandwidth query report (BQR) or a target wake time (TWT) element, and transmit the BQR or the TWT element including an indication of the determined value for the parameter.

Another apparatus for wireless communication at a station is described. The apparatus may include means for identifying an operating mode for an operating bandwidth of the station, determining, based on the identified operating mode, a value for a parameter of a bandwidth query report (BQR) or a target wake time (TWT) element, and transmitting the BQR or the TWT element including an indication of the determined value for the parameter.

A non-transitory computer-readable medium storing code for wireless communication at a station is described. The code may include instructions executable by a processor to identify an operating mode for an operating bandwidth of the station, determine, based on the identified operating mode, a value for a parameter of a bandwidth query report (BQR) or a target wake time (TWT) element, and transmit the BQR or the TWT element including an indication of the determined value for the parameter.

Some examples of the method, apparatuses, and non-transitory computer-readable medium described herein may further include operations, features, means, or instructions for receiving a request for the BQR, where the BQR may be transmitted in response to the received request.

In some examples of the method, apparatuses, and non-transitory computer-readable medium described herein, the value for the parameter of the BQR includes an indication of a sub-channel of the operating bandwidth available at the station.

In some examples of the method, apparatuses, and non-transitory computer-readable medium described herein, the transmitted BQR includes an indication of a duration of time for which the BQR may be valid.

In some examples of the method, apparatuses, and non-transitory computer-readable medium described herein, the indication of the duration of time indicates that the BQR does not expire.

In some examples of the method, apparatuses, and non-transitory computer-readable medium described herein, the indication of the duration of time indicates that the BQR may be valid for a duration of a current transmission opportunity, or a multi-user (MU) enhanced distributed coordination function (DCF) channel access (EDCA) parameter set duration, or a target wake time (TWT) service period duration, or a combination.

In some examples of the method, apparatuses, and non-transitory computer-readable medium described herein, the indication of the duration of time indicates an explicit duration of time.

In some examples of the method, apparatuses, and non-transitory computer-readable medium described herein, the value for the parameter of the TWT element identifies a secondary sub-channel of the operating bandwidth of the station.

In some examples of the method, apparatuses, and non-transitory computer-readable medium described herein, the value for the parameter of the TWT element includes an indication of a sub-channel of the operating bandwidth available at the station.

In some examples of the method, apparatuses, and non-transitory computer-readable medium described herein, the value for the bandwidth parameter of the BQR or the TWT element includes an indication of a duration of time that one or more sub-channels of the operating bandwidth of the station may be to be busy or available.

In some examples of the method, apparatuses, and non-transitory computer-readable medium described herein, a granularity of the indication in the BQR or the TWT element may be based on the operating bandwidth of the station, or a bandwidth supported by the station, or a bandwidth supported by a device receiving the BQR or the TWT element, or a bandwidth specified by a request for the BQR, or the bandwidth may be indicated in the BQR, or a combination.

Some examples of the method, apparatuses, and non-transitory computer-readable medium described herein may further include operations, features, means, or instructions for determining, based on the identified operating mode, a value for a parameter of a second BQR or a second TWT element, and transmitting the second BQR or the second TWT element including an indication of the determined value for the parameter.

In some examples of the method, apparatuses, and non-transitory computer-readable medium described herein, the operating bandwidth of the station includes 320 MHz, the BQR or the TWT element associated with a first portion of the operating bandwidth, and the second BQR or the second TWT element associated with a second portion of the operating bandwidth.

Some examples of the method, apparatuses, and non-transitory computer-readable medium described herein may further include operations, features, means, or instructions for receiving a control transmission from an access point, where the identifying may be based at least in part the control transmission, and determining one or more of a channel width, an uplink bandwidth, or a resource unit allocation for the station based on the operating bandwidth of the station.

In some examples of the method, apparatuses, and non-transitory computer-readable medium described herein, determining the uplink bandwidth or the resource unit allocation may include operations, features, means, or instructions for identifying at least one field in a common information field of the control transmission as indicating the uplink bandwidth or the resource unit allocation for the station based on the identified operating bandwidth of the station, where the received control transmission includes a trigger frame.

In some examples of the method, apparatuses, and non-transitory computer-readable medium described herein, the operating bandwidth of the station includes 320 MHz, and the operating mode may be a 20 MHz operating mode, or a 40 MHz operating mode, or 80 MHz operating mode, or an 80+80 MHz operating mode, or a 160 MHz operating mode, or a 320 MHz operating mode, or a 160+160 MHz operating mode.

Some examples of the method, apparatuses, and non-transitory computer-readable medium described herein may further include operations, features, means, or instructions for identifying that the station may have data for transmission to an access point, the access point supporting communication on one or more sub-channels of the operating bandwidth of the station, monitoring one or more network allocation vectors (NAVs) for the one or more sub-channels of the operating bandwidth of the station, and maintaining a timer for each NAV of the one or more NAVs based on the monitoring.

Some examples of the method, apparatuses, and non-transitory computer-readable medium described herein may further include operations, features, means, or instructions for sensing a medium for the one or more sub-channels based on determining that one or more NAVs for the one or more sub-channels may be inactive, and transmitting feedback for the one or more NAVs based on the sensing.

In some examples of the method, apparatuses, and non-transitory computer-readable medium described herein, each NAV of the one or more NAVs may be for one or more sub-channels of the operating bandwidth.

In some examples of the method, apparatuses, and non-transitory computer-readable medium described herein, the operating bandwidth includes one or more primary channels, the one or more sub-channels including the one or more primary channels.

DETAILED DESCRIPTION

Figure 1:
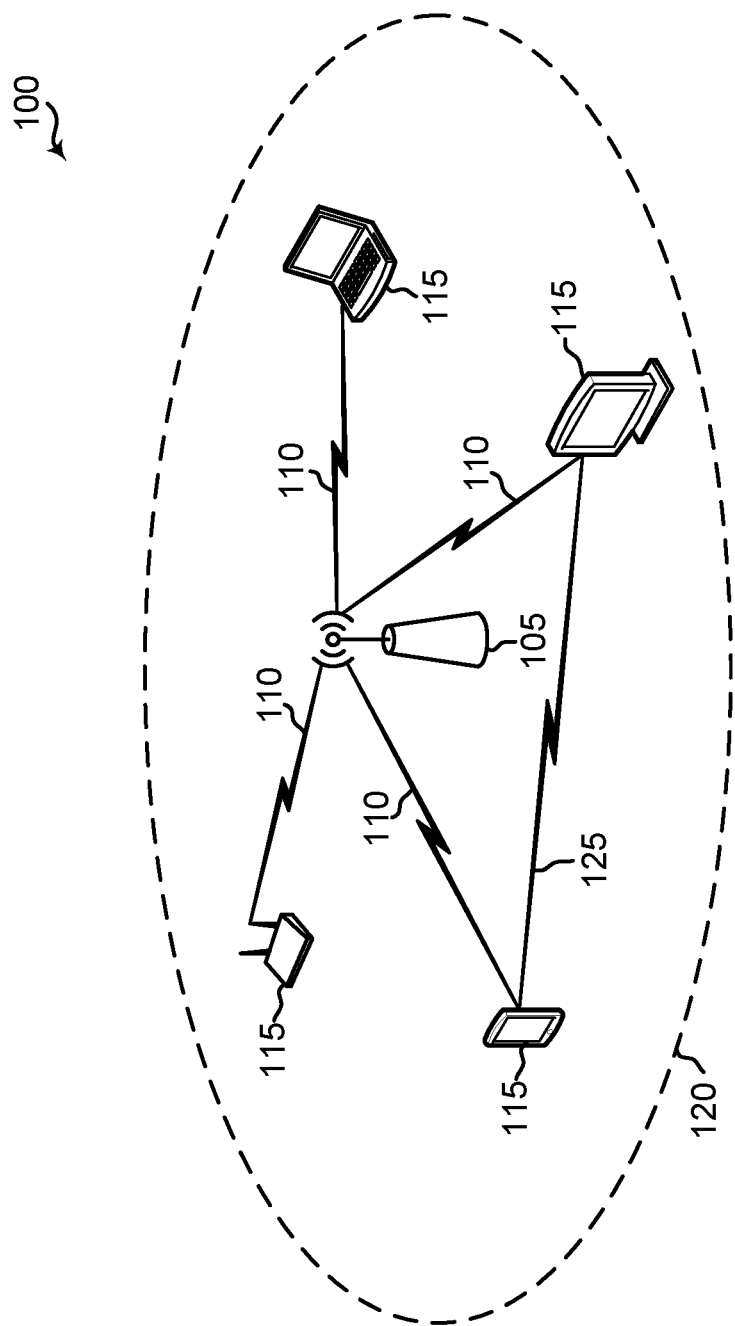
FIG. 1 shows a block diagram of an example wireless communication system that supports a 320 MHz operating bandwidth in accordance with aspects of the present disclosure.

The following description is directed to implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to any of the IEEE 802.11 standards, or the Bluetooth® standards. The described implementations also can be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, extremely high throughput (EHT) environments may provide additional capabilities over other environments (for example, high efficiency (HE) environments). EHT environments may be configured to support flexible operating bandwidth enhancements at access points (APs) or stations (STAs), such as a broadened operating bandwidth relative to legacy device operation or granular operation within primary or secondary channel bandwidth spectrum. For example, an EHT environment may be configured to allow communications spanning a total operating channel bandwidth of 320

MHz. The operating bandwidth may also accommodate concurrent operation on other frequency bands (such as the 6 GHz band) and a portion of spectrum that includes frequency bands traditionally used by Wi-Fi technology, such as the 5 GHz band, the 2.4 GHz band, the 60 GHz band, the 3.6 GHz band, and the 900 MHz band. The operating bandwidth may be contiguous or span one or more disparate sub-channel sets. In some examples, operability enhancements associated with EHT environments, in particular operation at an increased bandwidth such as a total operating bandwidth of 320 MHz or 160+160 MHz, may make existing (legacy) rules, structures, and signaling inadequate. Additionally or alternatively, operability enhancements associated with EHT functionality and an extended supported bandwidth spectrum may leave granular refinements to carrier sensing and signal reporting mechanisms to be desired.

Techniques that extend existing techniques to enhance flexibility and to support functionality for EHT environments are described. Extensions may include modifications to existing rules, structures, or signaling implemented for legacy systems, for example supporting 20 MHz, 40 MHz, 80 MHz, 80+80 MHz, or 160 MHz operating modes, to support EHT environments (such as 160+160 MHz or 320 MHz operating modes). Extensions may include modifications to existing rules, structures, or signaling implemented for legacy systems, to support a broadened operating bandwidth, including EHT environments, or granular operation within a primary or secondary channel bandwidth spectrum. The extensions may be enabled by default as part of EHT functionality or indicated by mode, bit combinations, or active fields notifying support for an active mode.

An AP (or STA) may be configured to communicate to a STA (or an AP, respectively) an indication of an extension to existing fields, frames, or features. Such extensions may be indicated in part by the modification of fields or subfields of legacy frames, fields, or reports, and provide for broadened operating bandwidth or less granular operation within primary or secondary channel bandwidth spectrum. The extensions may be enabled by default as part of EHT functionality or explicitly or implicitly indicated by a combination of an operating mode and one or more bits of an active field (for example, by a bit value within the active field). Enablement of the extensions may be based on one or more of capabilities (for example, a reported bandwidth) at the AP or STA, the operating bandwidth of the BSS, or a request for reporting information.

In some examples, an STA may identify an operating mode for a supported operating bandwidth. Based on the operating mode, the STA may set the control ID subfield of a control subfield to a value indicative of a BQR indication within the associated control information subfield. The BQR indication may include an available channel bitmap for indication of which sub-channels of the operating bandwidth are available at the STA. Each bit in the channel bitmap may correspond to a particular sub-channel (for example, a 20 MHz channel) within the operating bandwidth width of the BSS with which the STA is associated. In some examples, an STA may set the control ID subfield of a control subfield to a value indicative of an operating mode (OM) control of the STA, within the associated control information subfield. The OM control indication may be formatted to include one or more subfields, including a channel width subfield indicating an operating bandwidth width supported by the STA for both transmission and reception.

In some examples, an STA may be configured for negotiating scheduling operability with an AP according to a target wake time (TWT). The TWT functionality may define a specific time or set of times for the STA to access and communicate on the BSS. The STA may negotiate enablement of frame exchange on a non-primary sub-channel (for example, a secondary sub-channel) to maximize TWT operability at the STA. As part of the individual TWT negotiation, the STA may format a TWT element. The TWT element may include one or more subfields, including a TWT parameter information subfield of variable length. The TWT parameter information subfield may be formatted to include one or more subfields, including a TWT channel subfield. The TWT channel subfield may include an available channel bitmap for indication of which sub-channels of the operating bandwidth are permitted by the STA for enabling frame exchange with the AP.

Additionally or alternatively, EHT devices operating on flexible bandwidth may support implementation of new structures for one or more of the described reporting mechanisms or subfield indications. In some examples, HE-capable APs or STAs may define new variants of a BQR mechanism to support added flexibility and granularity based on an active operating mode. In some examples, the active operating mode may be a device mode associated with a specific time during which or operating bandwidth in which the EHT device may be active to access and communicate with an AP or STA. In some examples, the EHT APs or STAs may define new variants of an OM control subfield to support added flexibility and granularity based on the active operating mode. In some examples, the EHT APs or STAs may define new variants of a TWT parameter set to support added flexibility and granularity based on the active operating mode.

In other examples, an STA supporting EHT functionality may support extensions to checking a network allocation vector (NAV) that represents a duration remaining on a shared channel that is occupied by another STA. Due to extensions and supported functionality for extended operating bandwidth spectrum, an STA may perform a NAV checking procedure for each of one or more sub-channels in addition to, or as an alternative to, the primary channel of the operating bandwidth (that is, the STA may perform a per-channel NAV check). The per-channel NAV check may enhance functional granularity at the STA for avoiding signaling interference with neighboring devices, particularly for operations on secondary channels distant from the primary channel of the BSS. In addition, the system may be configured to include more than one primary channel based on the extended operating bandwidth. The one or more primary channels may be configured flexibly, providing for concurrent operations of one or more channels (which may be or include one or more primary channels) on traditional Wi-Fi frequency bands (for example, such as the 5 GHz band, the 2.4 GHz band, the 60 GHz band, the 3.6 GHz band, the 900 MHz band), and concurrent operation on one or more other shared channels (for example, 6 GHz bandwidth spectrum) spanned by the operating bandwidth.

Particular implementations of the subject matter described in this disclosure can be implemented to realize one or more of the following potential advantages. For example, the described extensions of legacy structures may allow for EHT operation of EHT-compatible STAs. For example, EHT STAs may coexist with non-EHT STAs that may operate using legacy structures. The described extensions may include minimal or relatively small modifications to existing signaling structures, and allow the harmonious operation of both EHT STAs and non-EHT STAs within the same network or BSS. In other examples, the described extensions for NAV checking and the flexible use of channels in different bandwidth spectrum may allow for higher throughput, increased bandwidth and the dynamic adjustment of the channels used for communications between EHT STAs and APs. In addition, the extensions may allow for non-EHT operation of such STAs when channel conditions (for example, noise, interference) limit the availability for the EHT operating bandwidth.

FIG. 1 shows a block diagram of an example wireless communication system 100 that supports a 320 MHz operating bandwidth in accordance with aspects of the present disclosure. According to some aspects, the wireless communication system 100 can be an example of a wireless local area network (WLAN) (and will hereinafter be referred to as WLAN 100). For example, the WLAN 100 can be a network implementing at least one of the IEEE 802.11 family of standards. The WLAN 100 may include numerous wireless devices such as an access point (AP) 105 and multiple associated stations (STAs) 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

Each of the STAs 115 may associate and communicate with the AP 105 via a communication link 110. The various STAs 115 in the network are able to communicate with one another through the AP 105. A single AP 105 and an associated set of STAs 115 may be referred to as a basic service set (BSS). FIG. 1 additionally shows an example coverage area 120 of the AP 105, which may represent a basic service area (BSA) of the WLAN 100. While only one AP 105 is shown, the WLAN 100 can include multiple APs 105. An extremely service set (ESS) may include a set of connected BSSs. An extremely network station associated with the WLAN 100 may be coupled with a wired or wireless distribution system that may allow multiple APs 105 to be connected in such an ESS. As such, a STA 115 can be covered by more than one AP 105 and can associate with different APs 105 at different times for different transmissions.

STAs 115 may function and communicate (via the respective communication links 110) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, 802.11ba, and 802.11be. These standards define the WLAN radio and baseband protocols for the physical (PHY) layer and medium access control (MAC) layer. The wireless devices in the WLAN 100 may communicate over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. The unlicensed spectrum may also include other frequency bands, such as the emerging 6 GHz band. The wireless devices in the WLAN 100 also can be configured to communicate over other frequency bands such as shared licensed frequency bands, in which multiple operators may have a license to operate in the same or overlapping frequency band or bands.

In some examples, STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some examples, ad hoc networks may be implemented within a larger wireless network such as the WLAN 100. In such implementations, while the STAs 115 may be capable of communicating with each other through the AP 105 using communication links 110, STAs 115 also can communicate directly with each other via direct wireless communication links 125. Additionally, two STAs 115 may communicate via a direct communication link 125 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless communication links 125 include Wi-Fi Direct connections, connections established by using a Wi-Fi Tunneled Direct Link Setup (TDLS) link, and other peer-to-peer (P2P) group connections.

Some types of STAs 115 may provide for automated communication. Automated wireless devices may include those implementing internet-of-things (IoT) communication, Machine-to-Machine (M2M) communication, or machine type communication (MTC). IoT, M2M or MTC may refer to data communication technologies that allow devices to communicate without human intervention. For example, IoT, M2M or MTC may refer to communications from STAs 115 that integrate sensors or meters to measure or capture information and relay that information to a central server or application program that can make use of the information or present the information to humans interacting with the program or application.

Some of STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

WLAN 100 may support beamformed transmissions. As an example, AP 105 may use multiple antennas or antenna arrays to conduct beamforming operations for directional communications with a STA 115. Beamforming (which may also be referred to as spatial filtering or directional transmission) is a signal processing technique that may be used at a transmitter (for example, AP 105) to shape and/or steer an overall antenna beam in the direction of a target receiver (for example, a STA 115). Beamforming may be achieved by combining elements in an antenna array in such a way that transmitted signals at particular angles experience constructive interference while others experience destructive interference. In some examples, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (for example, or antenna port) such that the desired beamforming effects are achieved. In some examples, these weights may be determined before beamforming can be employed. For example, the transmitter (for example, the AP 105) may transmit one or more sounding packets to the receiver in order to determine CSI.

WLAN 100 may further support multiple-input, multiple-output (MIMO) wireless systems. Such systems may use a transmission scheme between a transmitter (for example, AP 105) and a receiver (for example, a STA 115), in which both transmitter and receiver are equipped with multiple antennas. For example, AP 105 may have an antenna array with a number of rows and columns of antenna ports that the AP 105 may use for beamforming in its communication with a STA 115. Signals may be transmitted multiple times in different directions (for example, each transmission may be beamformed differently). The receiver (for example, STA 115) may try multiple beams (for example, antenna subarrays) while receiving the signals.

WLAN PDUs may be transmitted over a radio frequency spectrum band, which in some examples may include multiple sub-bands or frequency channels. In some examples, the radio frequency spectrum band may have a bandwidth of 80 MHz, and each of the sub-bands or channels may have a bandwidth of 20 MHz. Transmissions to and from STAs 115 and APs 105 may include control information within a header that is transmitted prior to data transmissions. The information provided in a header is used by a receiving device to decode the subsequent data. A legacy WLAN preamble may include legacy short training field (STF) (L-STF) information, legacy LTF (L-LTF) information, and legacy signaling (L-SIG) information. The legacy preamble may be used for packet detection, automatic gain control and channel estimation, among other uses. The legacy preamble may also be used to maintain compatibility with legacy devices.

Figure 2:
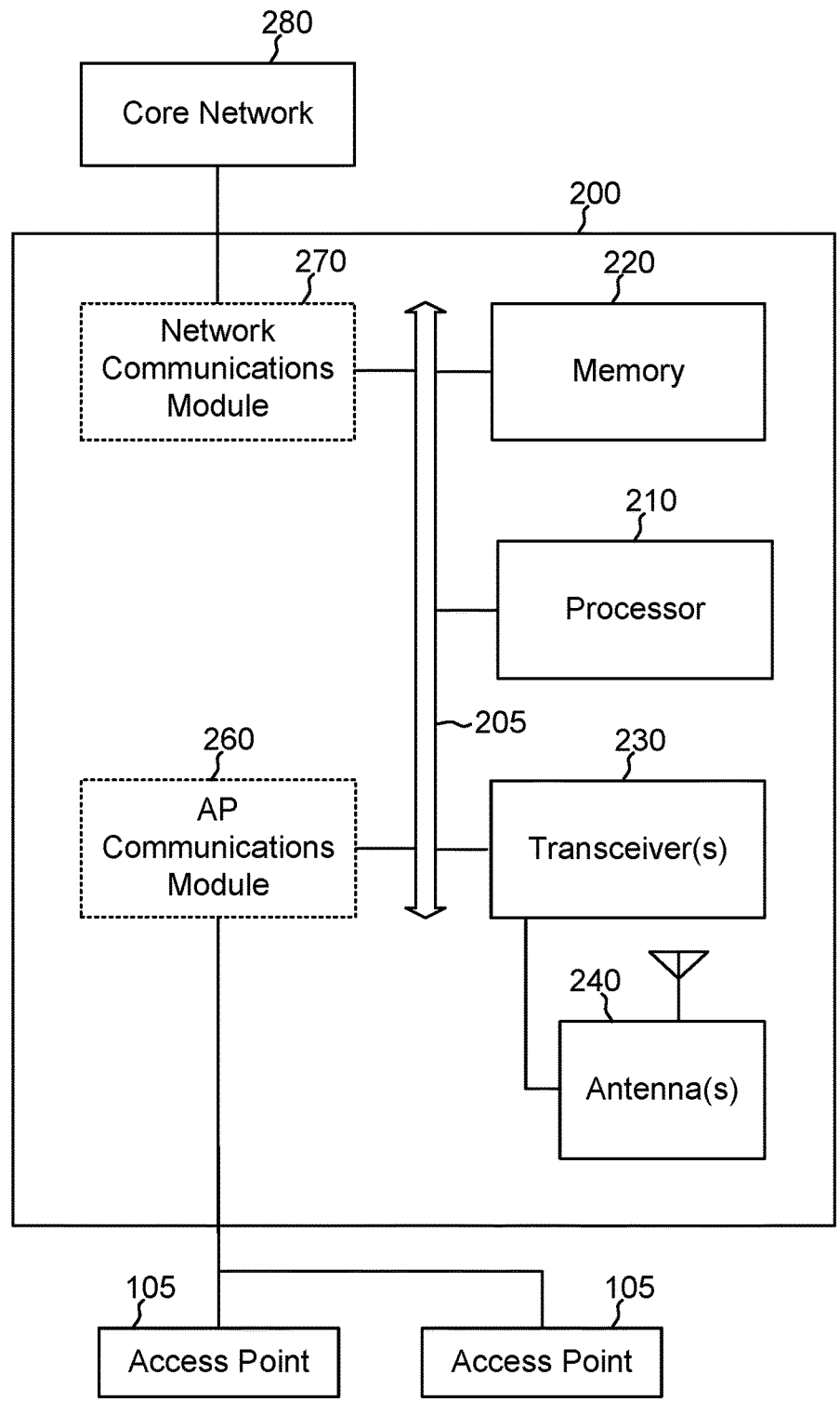
FIG. 2 shows a block diagram of an example AP for use in wireless communication that supports a 320 MHz operating bandwidth in accordance with aspects of the present disclosure.

FIG. 2 shows a block diagram of an example AP 200 for use in wireless communication that supports a 320 MHz operating bandwidth in accordance with aspects of the present disclosure. For example, the AP 200 may be an example of aspects of the AP 105 described in FIG. 1. The AP 200 can be configured to send and receive WLAN frames (also referred to herein as transmissions or communications) conforming to an IEEE 802.11 standard (such as the 802.11ac, 802.11ax, or 802.11be amendments to the 802.11 family of standards), as well as to encode and decode such frames. The AP 200 includes a processor 210, a memory 220, at least one transceiver 230 and at least one antenna 240. In some examples, the AP 200 also includes one or both of an AP communications module 260 and a network communications module 270. Each of the components (or "modules") described in FIG. 2 can communicate with one another, directly or indirectly, over at least one bus 205.

The memory 220 can include random access memory (RAM) and read-only memory (ROM). The memory 220 also can store processor- or computer-executable software code 225 containing instructions that, when executed by the processor 210, cause the processor to perform various functions described herein for wireless communication, including generation and transmission of a downlink frame and reception of an uplink frame.

The processor 210 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 210 processes information received through the transceiver 230, the AP communications module 260, and the network communications module 270. The processor 210 also can process information to be sent to the transceiver 230 for transmission through the antenna 240, information to be sent to the AP communications module 260, and information to be sent to the network communications module 270. The processor 210 can be configured to perform various operations related to generating and transmitting a downlink frame and receiving an uplink frame.

The transceiver 230 can include a modem to modulate packets and provide the modulated packets to the antenna 240 for transmission, as well as to demodulate packets received from the antenna 240. The transceiver 230 can be implemented as at least one radio frequency (RF) transmitter and at least one separate RF receiver. The transceiver 230 can communicate bi-directionally, via the antenna 240, with at least one STA 115 as, for example, shown in FIG. 1. Although only one transceiver 230 and one antenna 240 are shown in FIG. 2, the AP 200 may include multiple transceivers 230 and antennas 240. For example, in some AP implementations, the AP 200 can include multiple transmit antennas (each with a corresponding transmit chain) and multiple receive antennas (each with a corresponding receive chain). The AP 200 may communicate with a core network 280 through the network communications module 270. The system also may communicate with other APs, such as APs 105, using the AP communications module 260.

Figure 3:
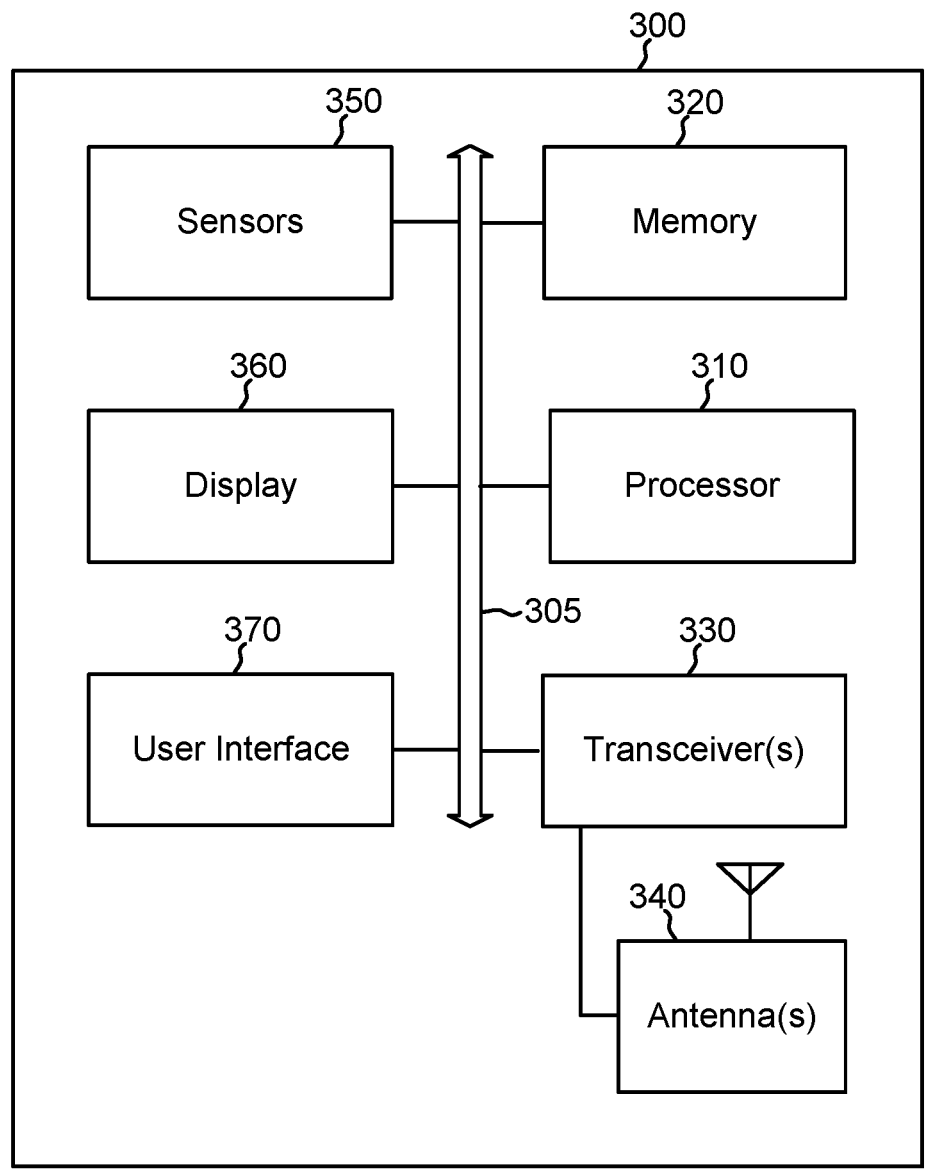
FIG. 3 shows a block diagram of an example STA for use in wireless communication that supports a 320 MHz operating bandwidth in accordance with aspects of the present disclosure.

FIG. 3 shows a block diagram of an example STA 300 for use in wireless communication that supports a 320 MHz operating bandwidth in accordance with aspects of the present disclosure. For example, the STA 300 may be an example of aspects of the STA 115 described in FIG. 1. The STA 300 can be configured to send and receive WLAN frames (also referred to herein as transmissions or communications) conforming to an IEEE 802.11 standard (such as the 802.11ac, 802.11ax, or 802.11be amendments to the 802.11 family of standards), as well as to encode and decode such frames. The STA 300 includes a processor 310, a memory 320, at least one transceiver 330 and at least one antenna 340. In some examples, the STA 300 additionally includes one or more of sensors 350, a display 360 and a user interface (UI) 370 (such as a touchscreen or keypad). Each of the components (or "modules") described in FIG. 3 can communicate with one another, directly or indirectly, over at least one bus 305.

The memory 320 can include RAM and ROM. The memory 320 also can store processor- or computer-executable software code 325 containing instructions that, when executed, cause the processor 310 to perform various functions described herein for wireless communication, including reception of a downlink frame and generation and transmission of an uplink frame.

The processor 310 includes an intelligent hardware device such as, for example, a CPU, a microcontroller, an ASIC or a PLD such as an FPGA, among other possibilities. The processor 310 processes information received through the transceiver 330 as well as information to be sent to the transceiver 330 for transmission through the antenna 340. The processor 310 can be configured to perform various operations related to receiving a downlink frame and generating and transmitting an uplink frame.

The transceiver 330 can include a modem to modulate packets and provide the modulated packets to the antenna 340 for transmission, as well as to demodulate packets received from the antenna 340. The transceiver 330 can be implemented as at least one RF transmitter and at least one separate RF receiver. The transceiver 330 can communicate bi-directionally, via the antenna 340, with at least one AP 105 as, for example, shown in FIG. 1. Although only one transceiver 330 and one antenna 340 are shown in FIG. 3, the STA 300 can include two or more antennas. For example, in some STA implementations, the STA 300 can include multiple transmit antennas (each with a corresponding transmit chain) and multiple receive antennas (each with a corresponding receive chain).

Figures 4A, 4B, 4C:
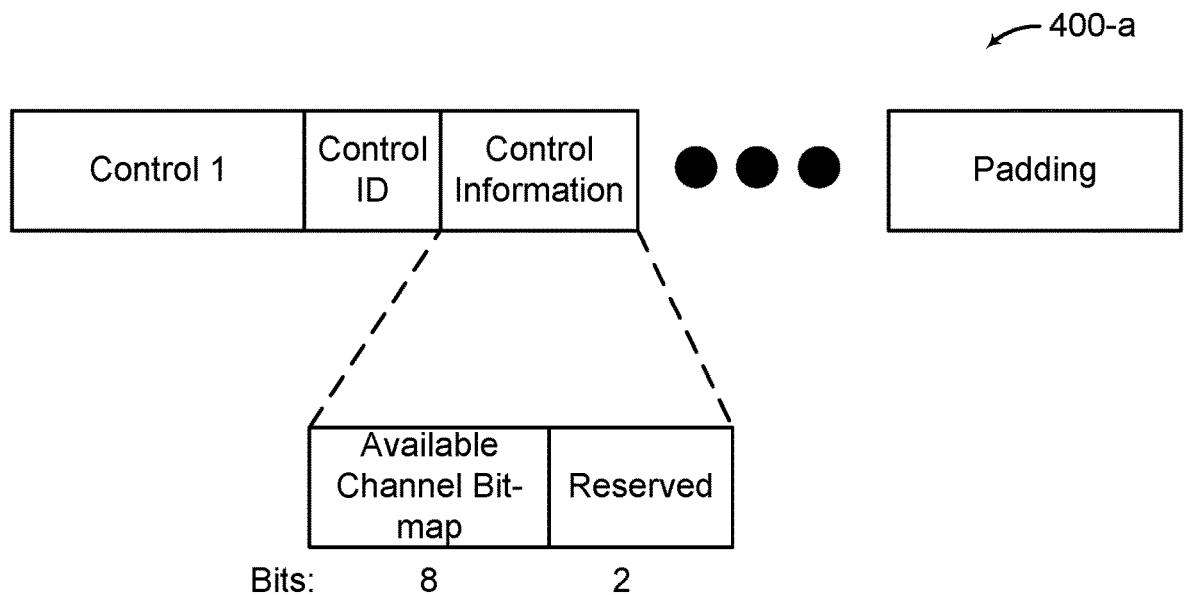
FIGS. 4A through 4C show examples of a control element format usable for wireless communications between an AP and an STA that supports a 320 MHz operating bandwidth in accordance with aspects of the present disclosure.

FIG. 4A shows an example of a control element format 400-a that supports a 320 MHz operating bandwidth in accordance with aspects of the present disclosure. Control element format 400-a may be usable for communications between a STA and an AP. For example, the control element format 400-a may be implemented by an STA supporting EHT functionality, for extensions to reporting indications associated with one or more control subfield formats of a control field form. The control field form may vary in subfield values or in subfield formatting based on supported functionality at the STA, known as a control field variant. The control field may contain a sequence of one or more control subfields (for example, as part of an A-Control subfield) in which each control subfield contains a control identification (ID) subfield and control information subfield, in accordance with the IEEE 802.11ax or 802.11be amendments to the 802.11 set of standards.

The STA may identify an operating mode for a supported operating bandwidth. Based on the identified operating mode, the STA may determine a value for one or more parameters of a BQR for transmission to an associated AP. For example, the STA may set the control ID subfield of a control subfield within control element format 400-a to a value indicative of a BQR indication within the associated control information subfield. The BQR indication may indicate one or more sub-channels of the operating bandwidth available at the STA. For example, the BQR indication within the control information subfield may include an available channel bitmap spanning 8 bits, for indication of which sub-channels of the operating bandwidth are available at the STA. Each bit in the channel bitmap may correspond to a particular sub-channel within the operating bandwidth width of the BSS with which the STA is associated. In addition, the BQR indication within the control information subfield may include a reserved subfield, spanning 4 bits.

In addition, each bit field of the available channel bitmap may indicate a channel availability for each of the one or more sub-channels. In some examples, the indication may further include a duration of time that the one or more sub-channels are available or occupied by data traffic. For example, the available channel bitmap may support binary indication representative of channel availability for the associated sub-channel of the operating bandwidth. Based on current specification, in accordance with the IEEE 802.11ax or 802.11be amendments to the 802.11 set of standards, a bit field may be set to 0 to indicate signal presence (also known as busy) and set to 1 to indicate idleness on the associated sub-channel. Extensions to the supporting functionality, as part of added flexibility for EHT operability enhancements, may allow reversal of the current meaning for each bit field of the channel bitmap. For example, a bit field value of 0 may indicate idleness on the associated sub-channel and a bit field value of 1 may indicate signal presence on the associated sub-channel.

Based on the supported EHT functionality, the STA may support flexibility extensions within the available channel bitmap, to indicate granularity associated with the mode of operation. The flexibility extensions may promote scaling of represented sub-channel features (for example, bandwidth granularity) associated with the bit field values of the channel bitmap. The flexibility extensions may be enabled by the STA based on default operations associated with the EHT functionality or one or more mode, bit combinations, or active fields indicating the active mode is supported, including one or more bit indications within a BQR field or EHT operation elements of the control element format 400-a.

In some examples, the STA may dynamically alter the sub-channel association for each bit within the channel bitmap based on the operating bandwidth specified in a BQR poll (BQRP). In some examples, the STA may dynamically alter the granularity of the available channel bitmap based on the supported operating bandwidth of the BSS. That is, the STA may alter the granularity of the channel bitmap according to the AP operation of the BSS supporting the communication link. In some examples, the STA may dynamically alter the granularity of the available channel bitmap based on the supported capability (for example, reported bandwidth) at the STA or based on the supported capability (for example, reported bandwidth) at the AP.

The alterations may be such that each bit field within the channel bitmap 400-b for the control information subfield is representative of an equal allocation of the supported operating bandwidth, as shown in FIG. 4B. That is, the bandwidth unit indicated within each respective bit of the channel bitmap may be obtained according to the quotient of the total operating bandwidth allocation (such as 320 MHz) divided by the size of the bitmap (for example, number of bits). For example, for an EHT supported operating bandwidth allocation of 320 MHz, each bit field of the 8 bit channel bitmap may represent a sub-channel allocation of 40 MHz, respectively. In other examples, for an EHT supported operating bandwidth allocation of 80 MHz, each bit field of the 8 bit channel bitmap may represent a sub-channel allocation of 10 MHz, respectively.

Alternatively, as shown in FIG. 4C, the alterations to the sub-channel association may be such that each bit field bitmap within the channel bitmap 400-c for the control information subfield may correspond to a scaled distribution pattern. That is, each bit field within the channel bitmap may correspond to sub-channels of different bandwidths. For example, for an EHT supported operating bandwidth allocation of 320 MHz, one or more bit fields of the 8 bit channel bitmap may represent a sub-channel allocation of 40 MHz, and one or more alternative bit fields may represent a sub-channel allocation of 60 MHz, 80 MHz, or any other sub-channel allocation within the operating bandwidth. In other examples, for an EHT supported operating bandwidth allocation 80 MHz, one or more bit fields of the 8 bit channel bitmap may represent a sub-channel allocation of 10 MHz, and one or more alternative bit fields may represent a sub-channel allocation of 20 MHz, 30 MHz, or any other sub-channel allocation within the operating bandwidth.

Based on the one or more parameters of the BQR indication, including the supported bit field value indication, the STA may transmit the configured BQR to an associated AP. The one or more parameters may indicate availability within each of the sub-channel partitions (for example, 8) of the operating bandwidth, associated with each bit field of the channel bitmap. Configuration of the extensions to the channel bitmap for supported granularity in EHT environments may be based on the one or more bit indications within a BQR field or EHT operation element of the control element format 400-a. For example, the bitmap for non-EHT supported STAs (for example, HE STAs) served by the AP on the BSS would maintain the legacy meaning as defined by IEEE 802.11ax or 802.11be amendments to the 802.11 set of standards. In other examples, the bitmap for EHT supported STAs served by the AP on the BSS would be based on the supported EHT functionality, including the determined parameter values as indicated by the one or more bit indications.

Additionally or alternatively, the one or more bit indications within the BQR field or EHT operation element may indicate permanence or intermittence of the reporting bandwidth and a validity period in the case of a temporary bandwidth indication. The indication of the validity period may specify that the reported bandwidth of the BQR is valid until the end of a transmission opportunity (TXOP), TWT service period (SP), or validity period for an enhanced digital channel access (EDCA) parameter for multi-user (MU) contexts. In some examples, the one or more bit indications within the BQR field or EHT operation element may indicate signal to noise ratio (SINR) statistics for the BSS and interaction indications between the BSS of the communication and other BSSs (OBSSs). The interaction indications may be used for scheduling purposes (for example, to allocate the STA in a sub-channel that is reported an idle) and interference avoidance (for example, not to allocate or transmit to the STA in a sub-channel reported as busy). Additionally, in some examples, the reported bandwidth may not be contiguous. In such cases, the BQR may apply to a sub-portion of the intermittent reported bandwidth, such as a primary spectrum, while preserving the legacy meaning of the field.

The described operating bandwidth and sub-channel allocations described in the provided examples for BQR operations are not limiting. Rather, extensions to flexibility and support for rules, structures, and signaling may vary dynamically to support an EHT environment. The extensions may include supported functionality for reporting bandwidth extensions beyond what is indicated in the current specification (for example, 160 MHz for HE devices), in accordance with the IEEE 802.11ax or 802.11be amendments to the 802.11 set of standards.

The extensions to flexibility and support for rules, structures, and signaling may include functionality for reporting bandwidth granularity or refinement within a reporting bandwidth smaller than that indicated in the current specification. Additionally or alternatively, the extensions may include supported functionality for reporting bandwidth extensions using a supported granularity, with multiple BQR reporting indications. In some examples, the STA may support capability for determining, based on an identified operating mode of an operating bandwidth, a value with a parameter of an additional (second) BQR indication. As detailed above, he BQR indication may indicate a first set of sub-channels of the operating bandwidth available at the STA and the second BQR indication may indicate a second set of sub-channels of the operating bandwidth available at the STA. For example, for an EHT supported operating bandwidth allocation of 320 MHz, one or more bit fields of a channel bitmap associated with the BQR indication may represent a sub-channel allocation of a first 160 MHz sub-channel of the 320 MHz channel. In addition, one or more bit fields of a channel bitmap associated with the second BQR indication may represent a sub-channel allocation of a second 160 MHz sub-channel of the 320 MHz channel. The described operating bandwidth and sub-channel allocations described in the provided example for multiple BQR operations are not limiting, and may include various sub-channel allocations within reporting bandwidth extensions beyond what is indicated in the current specification (for example 160 MHz for HE devices), in accordance with the IEEE 802.11ax or 802.11be amendments to the 802.11 set of standards.

Figures 5A, 5B:
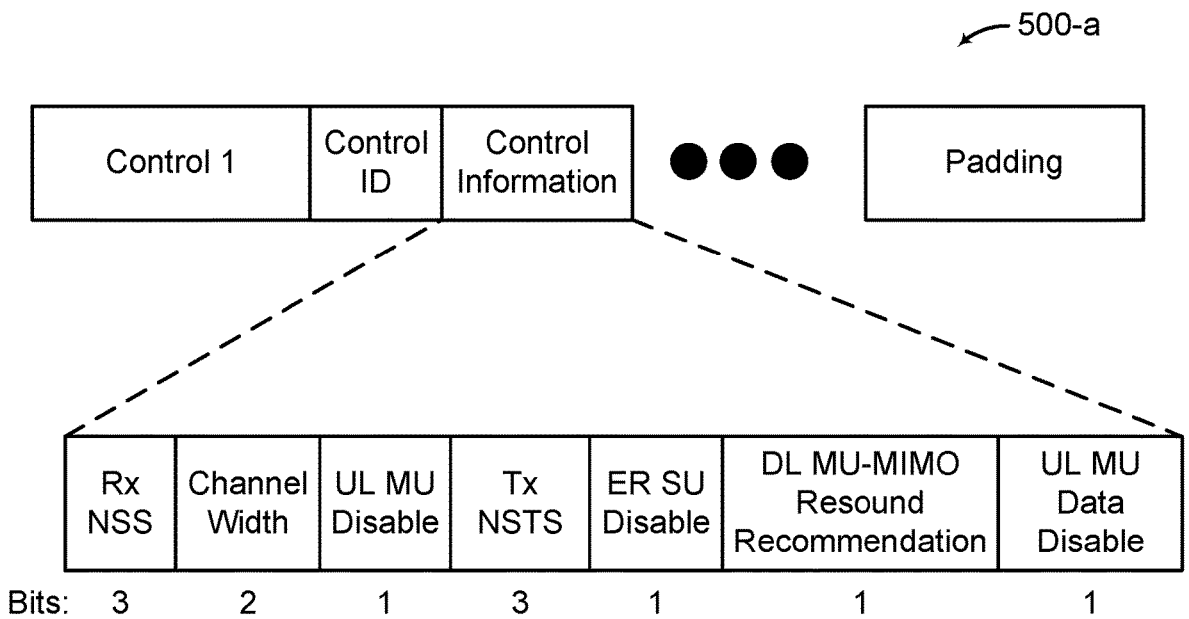
FIGS. 5A and 5B show examples of a control element format usable for wireless communications between an AP and an STA that supports a 320 MHz operating bandwidth in accordance with aspects of the present disclosure.

FIG. 5A shows an example of a control element format 500-a that supports a 320 MHz operating bandwidth in accordance with aspects of the present disclosure. Control element format 500-a may be usable for communications between a STA and an AP. For example, the control element format 500-a may be implemented by an STA supporting EHT functionality, for extensions to reporting indications associated with one or more control subfield formats of a control field form. The control field form may vary in subfield values or in subfield formatting based on supported functionality at the STA, known as a control field variant. The control field may contain a sequence of one or more control subfields (for example, as part of an A-Control subfield) in which each control subfield contains a control identification (ID) subfield and control information subfield, in accordance with the IEEE 802.11ax or 802.11be amendments to the 802.11 set of standards.

The STA may identify an operating mode for a supported operating bandwidth. Based on the identified operating mode, the STA may determine a value for one or more parameters of a BQR for transmission to an associated AP. For example, the STA set the control ID subfield of a control subfield within control element format 500-a to a value indicative of an operating mode (OM) control of the STA. The OM control indication may be formatted to include one or more subfields, including a channel width subfield spanning multiple (for example, 2) bits. The channel width subfield may indicate the operating bandwidth width supported by the STA for both transmission and reception. The 2 bit structure of the channel width subfield may correspond to a bitmap 500-b that includes 4 bit combination values (for example, 0, 1, 2, or 3) associated with reporting the operating bandwidth width, as shown in FIG. 5B.

Based on the supported EHT functionality, the STA may support an encoding scheme within the control information subfield, in which the one or more determined parameter values at the STA may indicate granularity associated with the mode of operation. The STA may perform the encoding according to implementation of one or more bit allocations available within subfields of the control information subfield. Specifically, the STA may use a reserved or unused combination of allocated bits for subfields of the OM control information subfield to signal an encoding of the channel width subfield based on the supported functionality and operability of the STA. For example, the UL MU disable, and UL MU data disable subfields of the OM control information subfield may have a reserved bit combination value (such as 1,1).

Additionally or alternatively, the STA may repurpose a reserved bit combination to indicate an encoding of the channel width subfield that supports granularity associated with an EHT mode of operation. For example, the STA may repurpose the reserved bit combination within the OM control subfield to indicate a different channel bandwidth encoding that supports bit value indications for 40 MHz, 80 MHz, 160 MHz, and 320 MHz or 160+160 MHz channel spectrum. In another example, the STA may repurpose the reserved bit combination within the OM control subfield to indicate a different channel bandwidth encoding that supports bit value indications for any combination of 40 MHz, 80 MHz, 160 MHz, 80+80 MHz, 320 MHz, and/or 160+160 MHz channel spectrum.

Due to the channel bandwidth encoding for EHT supported functionality being indicated according to a reserved field value of the OM control set, non-EHT STAs may continue to support the legacy meaning for channel bandwidth encoding. That is, EHT supported STAs may repurpose available reserved bits of the OM control subfield to indicate a different encoding scheme for the channel width subfield. In contrast, non-EHT STAs may obviate the repurposing mechanism, providing indication that the encoding as described within IEEE 802.11ax or 802.11be amendments to the 802.11 set of standards (for example, four values associated with channel widths of 20 MHz, 40 MHz, 80 MHz, and 160/80+80 MHz) may be maintained.

The described channel width allocations and encoding schemes described in the provided examples for OM control are not limiting. Rather, extensions to flexibility and support for rules, structures, and signaling may vary dynamically to support an EHT environment. The extensions may include supported functionality for reporting channel widths larger than what is indicated in the current specification, in accordance with the IEEE 802.11ax or 802.11be amendments to the 802.11 set of standards. Additionally or alternatively, the extensions may include supported functionality for an encoding scheme associated with channel width refinements smaller than that indicated in the current specification.

Figure 6:
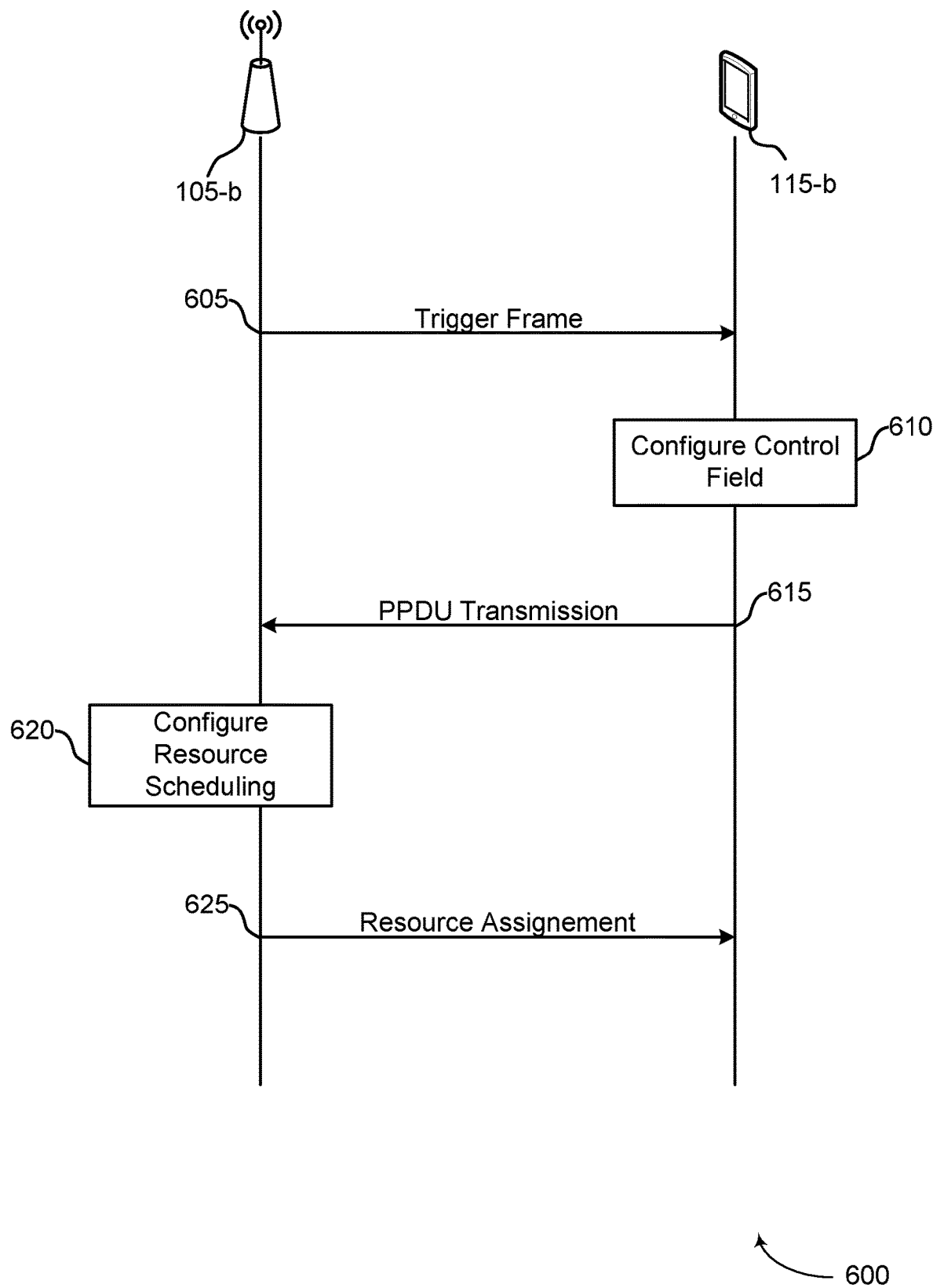
FIG. 6 shows an example of a process flow for communications between an AP and an STA that supports a 320 MHz operating bandwidth in accordance with aspects of the present disclosure.

FIG. 6 shows an example of a process flow 600 for communications between an AP and an STA that supports a 320 MHz operating bandwidth in accordance with aspects of the present disclosure. Process flow 600 may include one or more STAs 115 and APs 105 managing a BSS of the communication environment, as described in FIG. 1. As described, added flexibility to functionality for reporting mechanisms or subfield indications may be supported by an AP 105 or an STA 115 of the environment, for increased granularity for channel bitmap or operating bandwidth indication. The extensions to flexibility and supported functionality may be in accordance with EHT capability within the environment.

Process flow 600 may illustrate support for extensions to reporting indications associated with one or more control subfield formats of a control field form of a control field. The control field form may vary in subfield values or in subfield formatting based on supported functionality at the STA, known as a control field variant. The control field may contain a sequence of one or more control subfields (for example, as part of an A-Control subfield) in which each control subfield contains a control ID subfield and control information subfield.

At 605, an AP 105-b may transmit a trigger frame to one or more STAs, including an STA 115-b to coordinate uplink transmission. The trigger frame may be formatted to include one or more subfields spanning a sequence of bits. The one or more subfields of the trigger frame include information such as a payload length, bandwidth, RU allocation, and modulation scheme, as well as one or more request indications for reporting by the receiving STA 115-b.

At 610, the STA 115-b may receive and process the trigger frame. Based on the processing, the STA may determine one or more request indications for reporting and identify an operating mode for an operating bandwidth of the STA 115-b. Based on operability enhancements associated with an identified operating mode (for example, EHT capability), the STA 115-b may determine a value for one or more parameters of a BQR. For example, the STA 115-b may support extensions to flexibility for fields, frames, or features of a reporting indication associated with formatting of one or more control subfields of a control field. In some examples, the formatting may include dynamically altering the sub-channel association for each bit within the channel bitmap of a BQR. In other cases, the formatting may include implementation of an encoding scheme for identifying a channel width, as part of an OM control subfield.

At 615, the STA 115-b may transmit a HE TB PPDU response to the AP 105-b, including the subfield value and extensions supported for the mode of operation. The extensions may be indicated within the control field formatting of the response based on default operations associated with the EHT functionality or one or more modes, bit combinations, or active fields indicating the active mode is supported. Enablement of the extensions may be based on one or more of capability (for example, reported bandwidth) at the AP 105-b or STA 115-b, the operating bandwidth of the BSS, or a request for reporting information.

At 620, the AP 105-b may receive the HE TB PPDU response transmission and process the control field of the PPDU, including the extension indications for supported granularity of EHT operations. Based on the extension indications, the AP 105-a may determine the supported sub-channel allocations available at the STA 115-b from a BQR indication or determine the available channel width from an OM control subfield indication. At 625, the AP 105-b may configure a resource assignment for the STA 115-b based on the supported extensions to functionality for EHT operations.

Figures 7A, 7B, 7C:
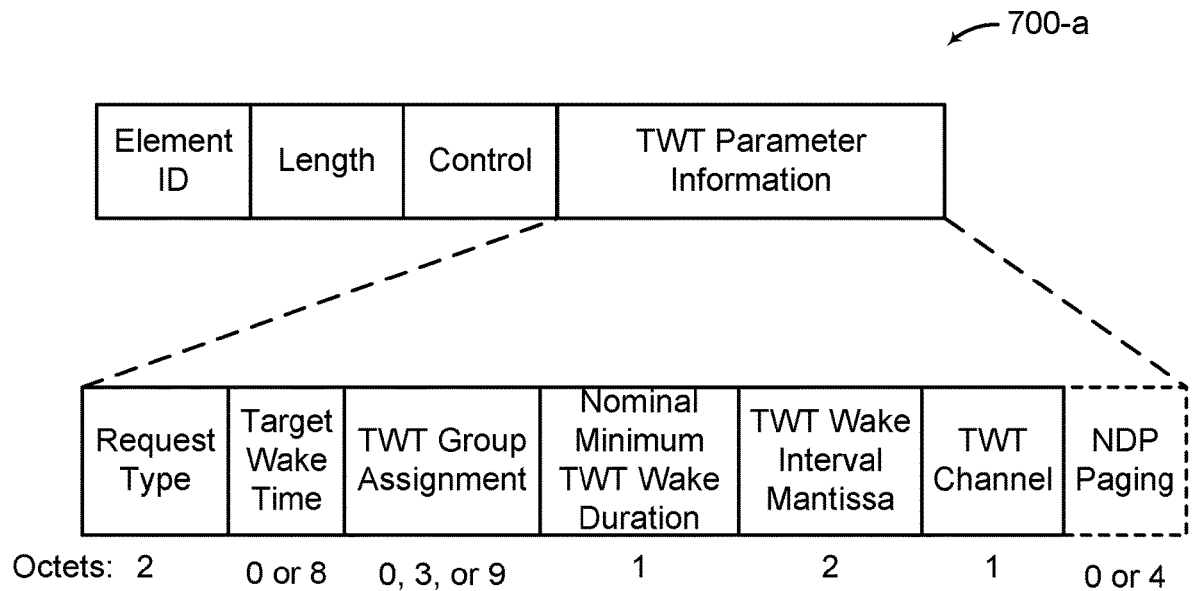
FIGS. 7A through 7C show an example of a TWT element format usable for wireless communications between an AP and an STA that supports a 320 MHz operating bandwidth in accordance with aspects of the present disclosure.

FIG. 7A shows an example of a TWT element format 700-a usable for wireless communications between an AP and an STA that supports a 320 MHz operating bandwidth in accordance with aspects of the present disclosure. TWT element format 700-a may be usable for communications between a STA and an AP. For example, the TWT element format 700-a may be implemented by an STA supporting EHT functionality, for extensions to reporting indications associated with a TWT element. In some examples, the extensions to a reporting indication may include TWT Parameter Information associated with an individual TWT negotiation procedure. The TWT element may contain a sequence of one or more subfields, including a TWT parameter information subfield spanning a variable number of octets and formatted according to a TWT parameter set field format, in accordance with the IEEE 802.11ax or 802.11be amendments to the 802.11 set of standards.

An STA supporting EHT functionality may be configured for negotiating scheduling operability with an AP according to a TWT. The TWT functionality may define a specific time or set of times for the STA to access and communicate on the BSS. The STA may use the TWT functionality to reduce energy consumption by, for example, entering a sleep state until the one or more configured wake periods arrive. Due to transmission of beacons, management frames, and additional frame indications by the AP, a concentration of signaling on the primary spectrum (for example, including the primary channel/sub-channel) of the BSS may impede maximization of TWT functionality support at the STA. The STA may instead, negotiate enablement of frame exchange on a non-primary sub-channel (for example, a secondary sub-channel) as part of a sub-channel selective transmission (SST) procedure.

The STA may identify an operating mode for a supported operating bandwidth. Based on the identified operating mode, the STA may determine a value for one or more parameters of a TWT element. For example, as part of the individual TWT negotiation, the STA may format the TWT parameter information subfield to an individual TWT parameter set field format. The individual TWT parameter set field format may include a sequence of subfields spanning a sequence of octets. The sequence of subfields may include a TWT channel subfield spanning a single octet. The TWT channel subfield may include an available channel bitmap spanning multiple (for example 8) bits, for indication of which sub-channels of the operating bandwidth are permitted by the STA for enabling frame exchange with the AP.

Based on the supported EHT functionality, the STA may support flexibility extensions within the available channel bitmap, to indicate granularity associated with the mode of operation. The flexibility extensions may promote scaling of represented sub-channel features (for example, bandwidth granularity) associated with the bit field values of the channel bitmap. The flexibility extensions may be enabled by the STA based on default operations associated with the EHT functionality or one or more mode, bit combinations, or active fields indicating the active mode is supported, including one or more bit indications within a TWT field or EHT operation elements of the control element format 700-a.

In some examples, the STA may dynamically alter the sub-channel association for each bit within the channel bitmap based on the operating bandwidth associated with an individual TWT negotiation procedure. In some examples, the STA may dynamically alter the granularity of the available channel bitmap based on the supported operating bandwidth of the BSS. That is, the STA may alter the granularity of the channel bitmap according to the AP operation of the BSS supporting the communication link. In some examples, the STA may dynamically alter the granularity of the available channel bitmap based on the supported capability (for example, reported bandwidth) at the STA or based on the supported capability (for example, reported bandwidth) at the AP.

The alterations may be such that each bit field within the channel bitmap 700-b is representative of an equal allocation of the supported operating bandwidth, as shown in FIG. 7B. For example, for an EHT supported operating bandwidth allocation of 320 MHz, each bit field of the 8 bit channel bitmap for the control information subfield may represent a sub-channel allocation of 40 MHz. In other examples, for an EHT supported operating bandwidth allocation of 80 MHz, each bit field of the 8 bit channel bitmap for the control information subfield may represent a sub-channel allocation of 10 MHz.

Alternatively, as shown in FIG. 7C, the alterations to the sub-channel association may be such that each bit field bitmap within the channel bitmap 700-c for the parameter information subfield may correspond to a scaled distribution pattern within the channel bitmap such that each bit field within the channel bitmap may correspond to sub-channels of various bandwidths. For example, for an EHT—supported operating—bandwidth allocation of 320 MHz, one or more bit fields of the 8 bit channel bitmap may represent a sub-channel allocation of 20 MHz, one or more alternative bit fields may represent a sub-channel allocation of 60 MHz, 80 MHz, or any other sub-channel allocation within the operating bandwidth. In other examples, for an EHT—supported operating—bandwidth allocation 80 MHz, one or more bit fields of the 8 bit channel bitmap may represent a sub-channel allocation of 10 MHz, one or more alternative bit fields may represent a sub-channel allocation of 20 MHz, 30 MHz, or any other sub-channel allocation within the operating bandwidth.

Based on the one or more parameters of the TWT parameter information subfield, including the supported bit field value indication, the STA transmits the TWT element to an associated AP. The STA may negotiate enablement of frame exchange availability for performing an SST procedure within spectrum associated with at least a portion of the sub-channel partitions (for example, 8 sub-channel partitions) of the operating bandwidth, associated with each bit field of the channel bitmap. Configuration of the extensions to the channel bitmap for supported granularity in EHT environments may be based on the one or more bit indications within a TWT field or EHT operation element of the TWT element format 700-a. The bitmap for non-EHT supported STAs (for example, HE STAs) served by the AP on the BSS would maintain the legacy meaning as defined by IEEE 802.11ax or 802.11be amendments to the 802.11 set of standards.

In some examples, the one or more bit indications within the TWT field or EHT operation element may indicate permanence or intermittence of the reporting bandwidth and a validity period in the case of a temporary bandwidth indication. The one or more bit indications may be used for scheduling purposes (for example, to allocate the STA in a sub-channel that is reported an idle) and interference avoidance (for example, not to allocate or transmit to the STA in a sub-channel reported as busy). Additionally, in some examples, the reported bandwidth may not be contiguous. In such cases, the TWT may apply to a sub-portion of the intermittent reported bandwidth, such as a primary spectrum, while preserving the legacy meaning of the field.

The described operating bandwidth and sub-channel allocations described in the provided examples for individual TWT negotiation are not limiting. Rather, extensions to flexibility and support for rules, structures, and signaling may vary dynamically to support an EHT environment. The extensions may include supported functionality for reporting bandwidth extensions beyond what is indicated in the current specification (for example 160 MHz for HE devices), in accordance with the IEEE 802.11ax or 802.11be amendments to the 802.11 set of standards.

Additionally or alternatively, the extensions to flexibility and support for rules, structures, and signaling may include functionality for reporting bandwidth granularity or refinement within a reporting bandwidth, the granularity or refinement being smaller than that indicated in other signaling applications. Additionally or alternatively, the extensions may include supported functionality for reporting bandwidth extensions using a supported granularity with multiple BQR reporting indications. In some examples, the STA may support capability for determining, based on an identified operating mode of an operating bandwidth, a value with a parameter of an additional (second) TWT element, as part of a TWT negotiation. As detailed above, the TWT element may indicate a first set of sub-channels of the operating bandwidth permitted by the STA for enabling frame exchange. In addition, and the second TWT element may indicate a second set of sub-channels of the operating bandwidth permitted by the STA for enabling frame exchange. For example, for an EHT-supported operating bandwidth allocation of 320 MHz, one or more bit fields of a channel bitmap may be associated with a TWT channel subfield of the TWT element. In some examples, the channel bitmap may represent a sub-channel allocation of a first 160 MHz. In addition, one or more bit fields of a channel bitmap associated with a TWT channel subfield of the TWT element may represent a sub-channel allocation of a second 160 MHz. The described operating bandwidth and sub-channel allocations described in the provided example for multiple TWT elements are not limiting, and may include various sub-channel allocations within reporting bandwidth extensions beyond what is indicated in the current specification (for example 160 MHz for HE devices), in accordance with the IEEE 802.11ax or 802.11be amendments to the 802.11 set of standards.

Figure 8:
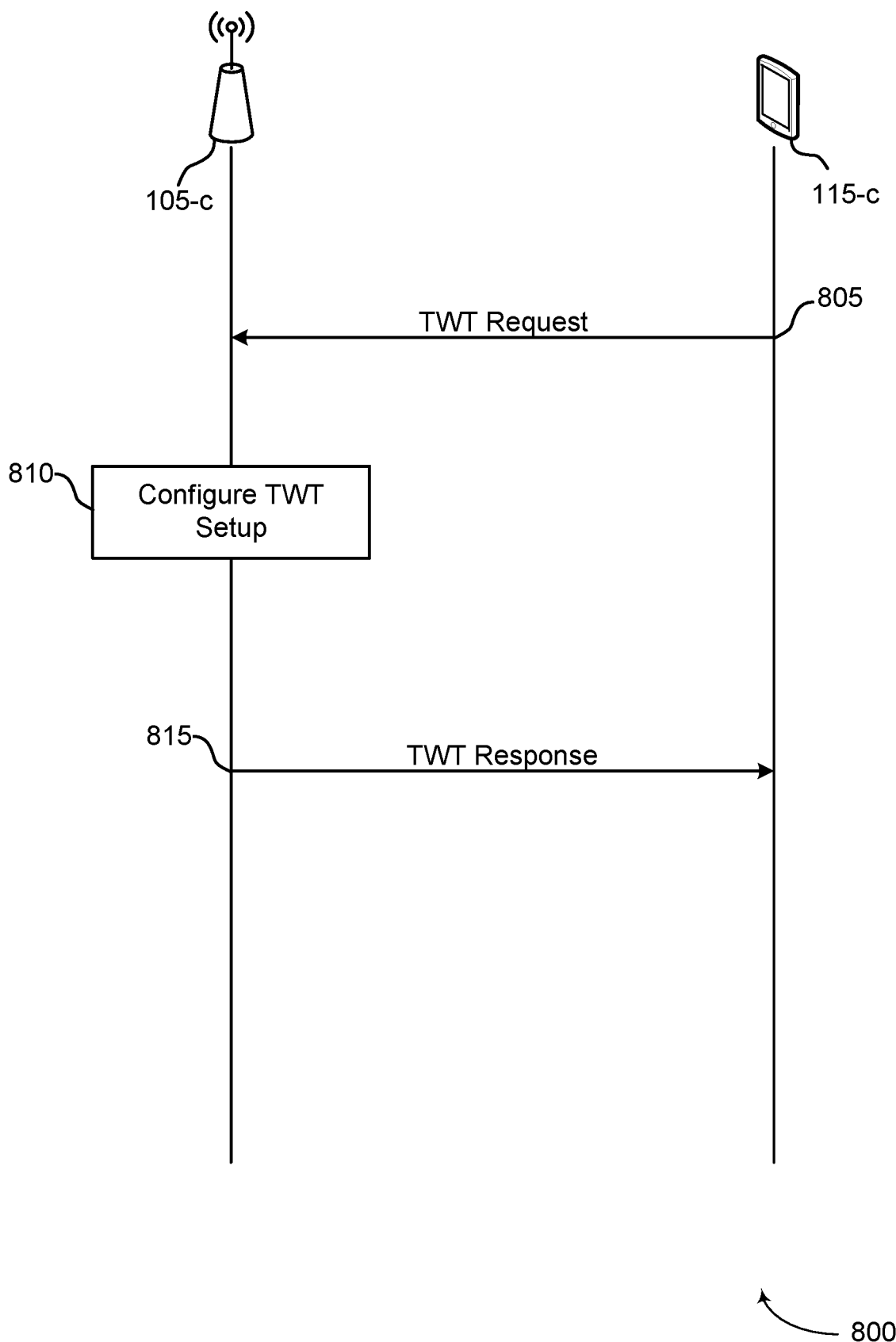
FIG. 8 shows an example of a process flow for communications between an AP and an STA that supports a 320 MHz operating bandwidth in accordance with aspects of the present disclosure.

FIG. 8 shows an example of a process flow 800 for communications between and AP and an STA that supports a 320 MHz operating bandwidth in accordance with aspects of the present disclosure. Process flow 800 may include one or more STAs 115 and APs 105 managing a BSS of the communication environment, as described in FIG. 1. As described, added flexibility to supported functionality for reporting mechanisms or subfield indications may be supported by an AP 105 or an STA 115 of the environment, for increased granularity for channel bitmap or operating bandwidth indication. The extensions to flexibility and supported functionality may be in accordance with EHT capability within the environment.

Process flow 800 may illustrate supported extensions to reporting indication associated with extensions to reporting indication associated with a TWT element, such as TWT Parameter Information associated with an individual TWT negotiation procedure. The TWT element may contain a sequence of one or more subfields, including a TWT parameter information subfield spanning a variable number of octets and formatted according to a TWT parameter set field format.

At 805, an STA 115-c implements an SST operation as part of a TWT negotiation procedure. The STA 115-c may identify an operating mode for an operating bandwidth of the STA 115-c. The STA 115-c may determine a value for one or more parameters of the TWT element. For example, the STA 115-c may set a capabilities element of the TWT element format to a value indicative of SST support and initiate individual TWT negotiation with an AP 105-c of a BSS. The STA 115-c may transmit a request for a secondary channel that is permitted for RU allocation. The TWT request may contain a TWT channel field indicating a secondary channel requested by the STA 115-c.

At 810, the AP 105-c may receive the TWT request as part of the TWT negotiation procedure. The AP 105-c may process the request, including the SST support indication for performing frame exchange on a secondary channel of the BSS. The AP 105-c may then allocate an RU in a secondary channel specified in the TWT channel field of the TWT request.

At 815, The AP 105-c may set a bit in a TWT channel field of a TWT response indicating a secondary channel that is permitted for RU allocation as part of a TWT operating procedure at the STA 115-c. AP 105-c may then transmit the TWT response to the STA 115-c.

Figure 9:
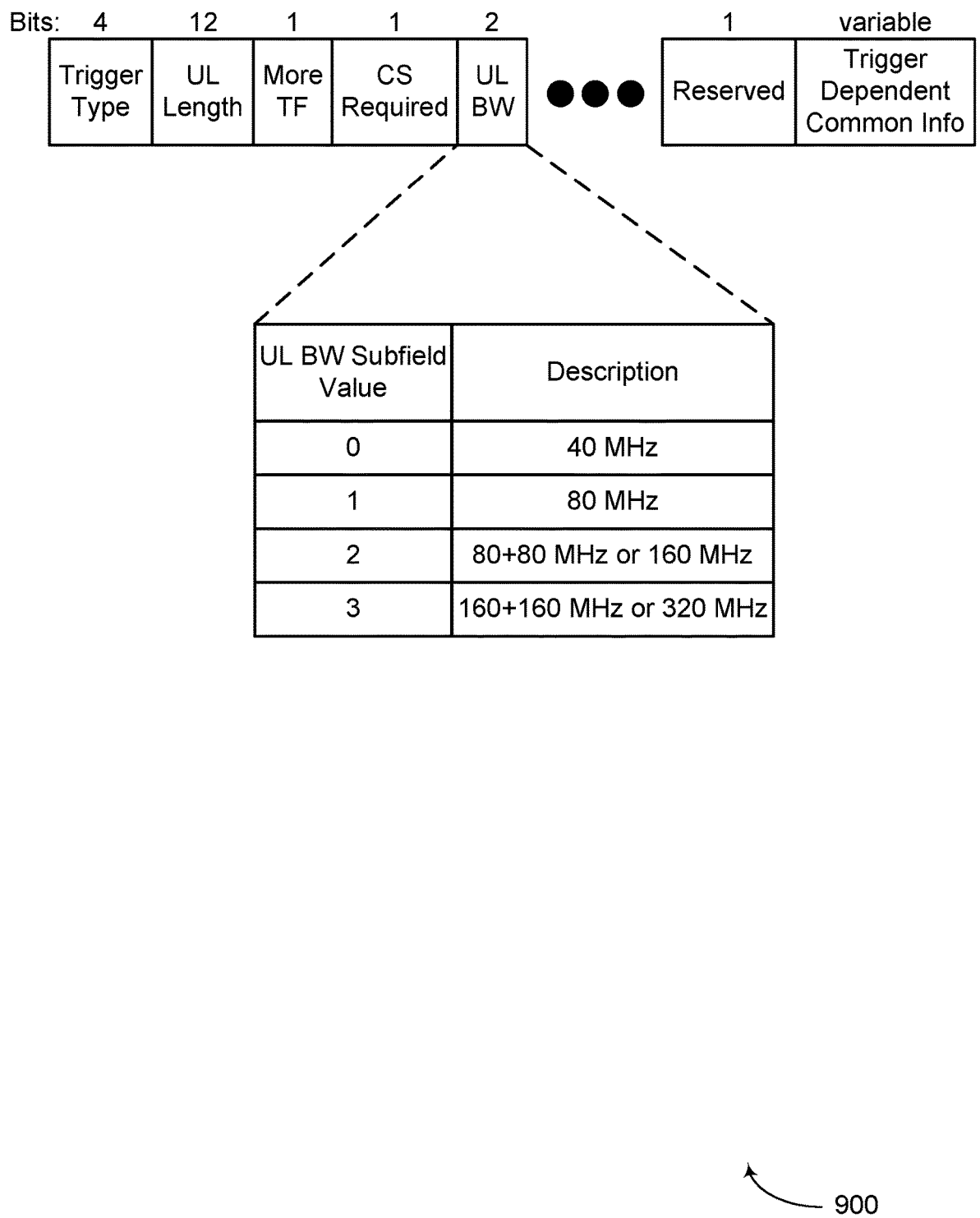
FIG. 9 shows an example of a common information field usable for wireless communications between an AP and an STA that supports a 320 MHz operating bandwidth in accordance with aspects of the present disclosure.

FIG. 9 shows an example of a common information field format 900 usable for wireless communications between an AP and an STA that supports a 320 MHz operating bandwidth in accordance with aspects of the present disclosure. For example, the AP may transmit a trigger frame to allocate resources for one or more HE TB PPDUs, which in some examples may coordinate uplink transmissions by the STA. The trigger frame may include a payload length, bandwidth, RU allocation, and modulation scheme information for the responding STA. The trigger frame may be formatted to include a sequence of one or more subfields, which may be included in a MAC header. The sequence of one or more subfields may include a common information field, spanning 8 or more octets, and a user information field, spanning 5 or more octets. Formatting of the common information field may be in accordance with the IEEE 802.11ax or 802.11be amendments to the 802.11 set of standards.

The common information field may be formatted to include one or more subfields, including an UL BW subfield spanning 2 bits. The UL BW subfield may indicate the bandwidth in the HE-SIG-A field of the HE TB PPDU. The 2-bit structure of the UL BW subfield may correspond to 4 bit combination values (for example, 0, 1, 2, or 3) associated with reporting the operating bandwidth for uplink signaling.

Based on the supported EHT functionality at the responding STA, the AP may extend an encoding scheme or resource allocation structure within the one or more subfields of the common information field to indicate granularity associated with the mode of operation at the STA. The AP may enable a different encoding scheme within the UL BW subfield of the common information field, to support operable granularity at the receiving STA of the trigger frame based on the active mode (for example, EHT functionality). In some examples, the AP may use a reserved or unused combination of allocated bits for subfields of the common information field (for example, bits in the trigger dependent common information field) to signal an encoding of the UL BW subfield based on the supported functionality and EHT operability of the STA. By signaling the encoding within the common information field, the encoding scheme may apply to the entire trigger frame. The STA may repurpose the reserved bit combination to indicate an encoding of the channel width subfield that supports granularity associated with an EHT mode of operation. For example, the AP may repurpose the reserved bit combination available in the common information field to indicate a different channel bandwidth encoding that supports bit value indications for 40 MHz, 80 MHz, 160 MHz, and 320 MHz or 160+160 MHz channel spectrum. In another example, the AP may repurpose the reserved bit combination available in the common information field to indicate a different channel bandwidth encoding that supports bit value indications for any combination of 40 MHz, 80 MHz, 160 MHz, 80+80 MHz, 320 MHz, and/or 160+160 MHz channel spectrum.

Due to the channel bandwidth encoding for EHT supported functionality being indicated according to a reserved bit combination in the common information field, non-EHT STAs may continue to support the legacy meaning for channel bandwidth encoding. That is, the AP may repurpose available reserved bits of the common information field to indicate a different encoding scheme for the UL BW subfield according to EHT STAs. In contrast, non-EHT STAs may obviate the repurposing mechanism, providing indication that the encoding as described within IEEE 802.11ax or 802.11be amendments to the 802.11 set of standards (for example, four values associated with channel widths of 20 MHz, 40 MHz, 60 MHz, and 160/80+80 MHz) may be maintained.

The encoding scheme described in the provided examples for the UL BW subfield is not limiting. Rather, extensions to flexibility and support for rules, structures, and signaling may vary dynamically to support an EHT environment. The extensions may include supported functionality for reporting channel widths larger than what is indicated in the current specification, in accordance with the IEEE 802.11ax or 802.11be amendments to the 802.11 set of standards. Additionally or alternatively, the extensions may include supported functionality for an encoding scheme associated with channel width refinements smaller than that indicated in the current specification.

Figure 10:
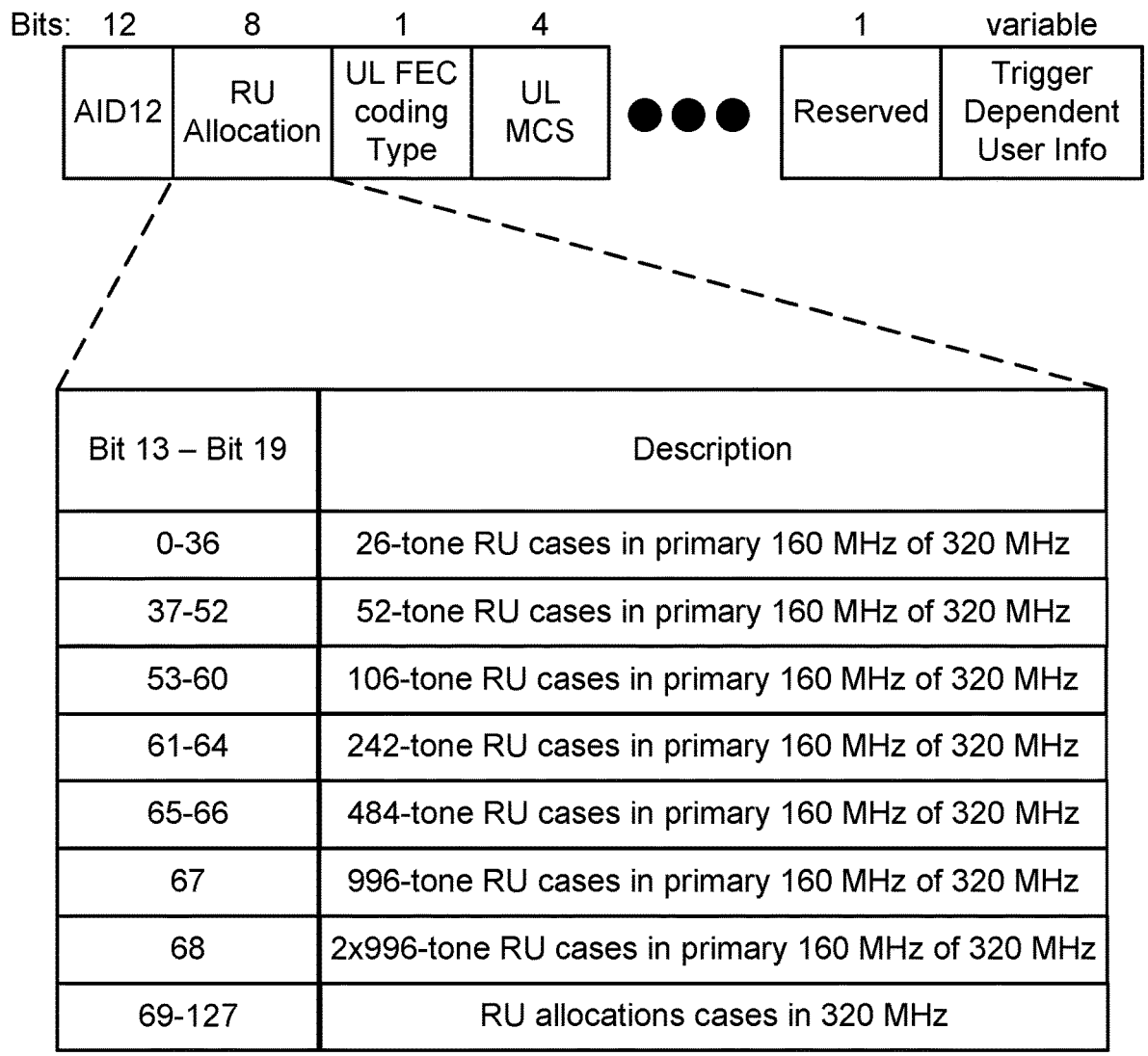
FIG. 10 show an example of a user information field usable for wireless communications between an AP and an STA that supports a 320 MHz operating bandwidth in accordance with aspects of the present disclosure.

FIG. 10 shows an example of a user information field format 1000 usable for wireless communications between an AP and an STA that supports a 320 MHz operating bandwidth in accordance with aspects of the present disclosure.

The user information field format may be usable for communications between a STA and an AP. For example, the AP may configure a trigger frame to allocate resources for, and solicit, one or more HE TB PPDUs indicating coordination for uplink transmission by the STA. The trigger frame may include a payload length, bandwidth, RU allocation, and modulation scheme information for the responding STA. The trigger frame may be formatted to include a sequence of one or more subfields, referred to as the MAC header. The sequence of one or more subfields may include a common information field, spanning 8 or more octets, and a user information field, spanning 5 or more octets. Formatting of the common information field may be in accordance with the IEEE 802.11ax or 802.11be amendments to the 802.11 set of standards.

The user information field may be formatted to include one or more subfields, including an RU allocation subfield. The RU allocation subfield may include an available channel bitmap, spanning 8 bits, encoded for indication of the RU of the HE TB PPDU for the receiving STA. Based on the supported EHT functionality at the receiving STA, the bitmapping may be encoded to indicate granularity associated with the mode of operation. Specifically, the AP may enable an encoding scheme within the RU allocation subfield such that one or more bit values of the bitmapping, denoted as reserved values by legacy devices, may support resource extension for operating bandwidth associated with EHT functionality.

In some examples, the AP may use a reserved or unused combination of allocated bits for subfields of the user information field (for example, bits in the trigger dependent user information field) to signal extensions to the encoding scheme of the RU allocation subfield based on the supported functionality and EHT operability of the STA. By signaling the encoding within the user information field, the encoding scheme may be directed to the recipient STA. The AP may enable encoding of the bitmapping for the RU allocation subfield to signal granular extensions associated with an EHT mode of operation. For example, the AP may repurpose the range of bit combinations denoted as reserved (for example 69-127) of the RU allocation subfield to indicate support for RU allocations in 320 MHz or 160+160 MHz.

Due to the encoding scheme for RU allocation based on EHT-—supported functionality being indicated according to a reserved bit combination in the user information field, non-EHT STAs may continue to support the legacy meaning for bit combinations of the RU allocation subfield. That is, the AP may repurpose the reserved combination of bits to indicate a different encoding scheme for the UL BW subfield within reserved bits of the user information field according to EHT STAs. In contrast, non-EHT STAs may obviate the repurposing mechanism, providing indication that the encoding as described within IEEE 802.11ax or 802.11be amendments to the 802.11 set of standards (for example, bit combinations 69-127 of the bitmapping may be denoted as reserved) may be maintained.

The encoding scheme described in the provided examples for the RU allocation subfield is not limiting. Rather, extensions to flexibility and support for rules, structure, and signaling may dynamically vary to support an EHT environment. The extensions may include supported functionality for reporting channel widths larger than what is indicated in the current specification, in accordance with the IEEE 802.11ax or 802.11be amendments to the 802.11 set of standards. Additionally or alternatively, the extensions may include supported functionality for an encoding scheme associated with channel width refinements smaller than that indicated in the current specification.

Figure 11:
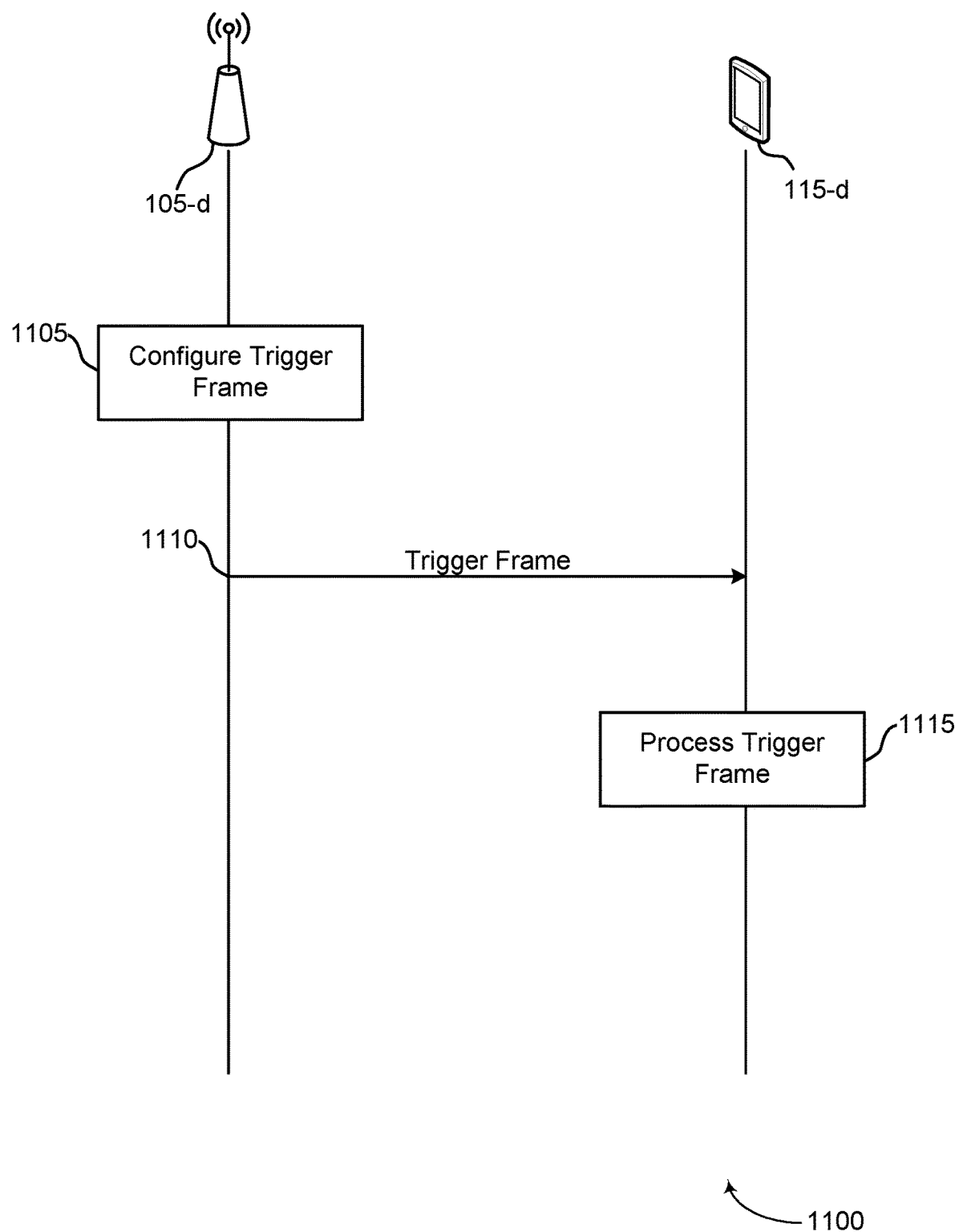
FIG. 11 shows an example of a process flow for communications between an AP and an STA that supports a 320 MHz operating bandwidth in accordance with aspects of the present disclosure.

FIG. 11 shows an example of a process flow 1100 for communications between an AP and an STA that supports a 320 MHz operating bandwidth in accordance with aspects of the present disclosure. Process flow 1100 may include one or more STAs 115 and APs 105 managing a BSS of the communication environment, as described in FIG. 1. As described, added flexibility to supported functionality for reporting mechanisms or subfield indications may be supported by an AP 105 or an STA 115 of the environment, for increased granularity for channel bitmap or operating bandwidth indication. The extensions to flexibility and supported functionality may be in accordance with EHT capability within the environment.

Process flow 1100 may support extensions to reporting indications associated with one or more field formats of a trigger frame. The trigger frame may contain a sequence of one or more fields spanning a sequence of bits. The one or more subfields of the trigger frame include information such as a payload length, bandwidth, RU allocation, and modulation scheme, as well as one or more request indications for reporting.

At 1105, an AP 105-*d* may configure a trigger frame format for STAs, including the STA 115-*d*, associated with a BSS it manages. The trigger frame may be formatted to include a sequence of one or more fields in a MAC header. The sequence of one or more fields may include a common information field and a user information field. Additionally or alternatively, the common information field may be formatted to include a sequence of subfields, including an UL BW subfield. The user information field may also be formatted to include a sequence of subfields, including an RU allocation subfield. Based on the supported EHT functionality at the responding STAs, including the STA 115-*d*, the AP 105-*d* may extend an encoding scheme or resource allocation structure within the one or more subfields of the common information subfield or the user information subfield, to indicate granularity associated with the mode of operation at the STA 115-*d*.

At 1110, the AP 105-*d* may transmit the trigger frame to one or more recipient STAs 115, including the STA 115-*d*, to coordinate uplink transmission. The trigger frame may be formatted to include one or more reserved bit indications for enabling an encoding scheme associated with granularity of the active mode for EHT supported STAs 115.

At 1115, the STA 115-*d* may receive and process the trigger frame. Based on the processing, the STA 115-*d* may determine an encoding scheme for reporting a supported operating bandwidth associated with EHT operation. The STA 115-*d* may support extensions for flexibility for fields, frames, or features of a reporting mechanism. In some examples, supported extensions may include an encoding of the UL BW subfield within the common information field with granularity to support EHT operation. In other cases, supported extensions may include an encoding of the RU allocation subfield within the user information field with granularity to indicate operations associated with operating bandwidth for EHT functionality.

Figure 12:
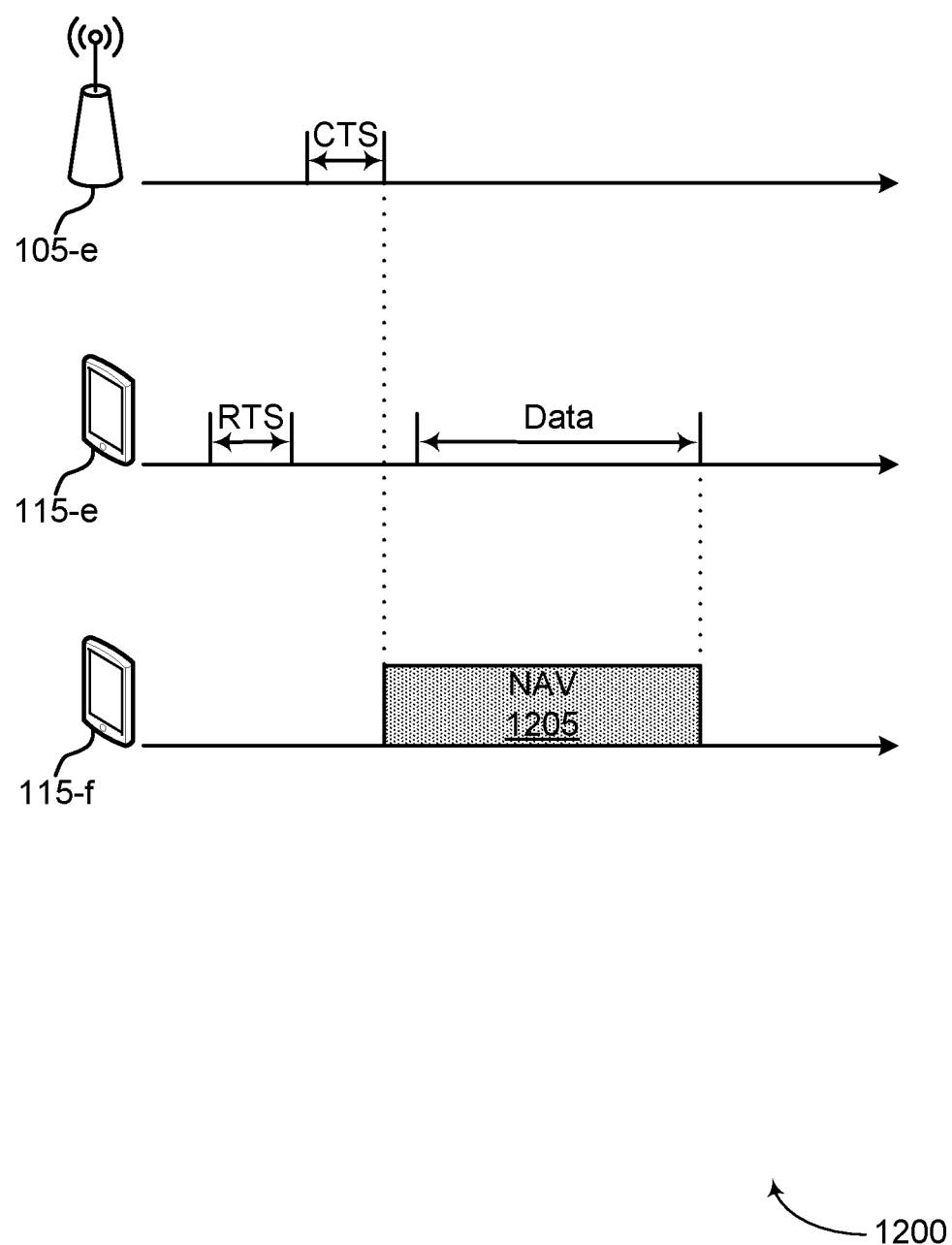
FIG. 12 shows an example of a schematic diagram for communications between an AP and an STA that supports a 320 MHz operating bandwidth in accordance with aspects of the present disclosure.

FIG. 12 shows an example of a schematic diagram 1200 between an AP and an STA that supports a 320 MHz operating bandwidth in accordance with aspects of the present disclosure. An AP 105-*e* may manage a BSS associated with resource allocation and communication for one or more STAs 115. Each of the STAs 115 may be served on one or more sub-channel allocations of the BSS and support respective operating bandwidths according to an operating mode. The one or more STAs 115 may be perceived as neighboring STAs relative to each STA 115.

Each of the STAs 115 may support a carrier sensing mechanism to avoid collisions associated with multiple data transmissions by STAs on common resources over a duration. For example, an STA (such as the STA 115-e or the STA 115-f) may identify data for transmission to the AP 105-e and sense the medium for the one or more sub-channel allocations of the BSS. The supported carrier sensing mechanism may use collision avoidance techniques implementing request-to-send (RTS) and clear-to-send (CTS) messaging between AP 105-e and the STAs 115 and in which peer STAs 115 relative to the RTS/CTS implementation may extract values from the RTS and CTS messages for updating configured NAVs.

As a condition for accessing the medium, an STA 115 may monitor (check the value of) a configured NAV, which is a counter resident at the STA 115 that is representative of the amount of time that remains on the shared channel that has been reserved by other STAs. For example, an STA 115-f may observe the RTS/CTS exchange between the AP 105-e and an STA 115-d,e and based on the exchange, update a NAV value associated with allocated resources (for example, assigned RUs) of the operating bandwidth. Prior to attempting to perform frame transmission, the STA 115-f may perform a NAV monitoring 1205 associated with the operating bandwidth and, in the case of present data traffic associated with the STA 115-e, abstain from data signaling until after the counter associated with the configured NAV has expired.

Based on the supported EHT functionality, as described above, the STA 115-f may support flexibility extensions to performing the NAV check associated with the operating bandwidth. In some cases, the STA 115-f may perform a NAV checking procedure for one or more sub-channels in addition to, or as an alternative to, the primary channel associated with the operating bandwidth. By performing a NAV check on non-primary sub-channels, the STA 115-f may support a more granular carrier sensing indication, particularly when the STA 115-f may occupy a set of sub-channels distant to the primary channel of the operating bandwidth. For example, the STA 115-f may operate in an extended bandwidth (for example, 320 MHz) associated with supported EHT functionality. The STA 115-f may be allocated resources on the upper 60 MHz of the operating bandwidth, while the primary channel may span a lower 20 MHz of the operating bandwidth.

Due to the spectral disparity between sub-channels occupied by the STA 115-f and the primary channel of the operating bandwidth, the STA 115-f may implement a granular NAV check 1205 local to the occupied sub-channels. Such an implementation may be referred to as a per-channel NAV check. In some cases, the per-channel NAV check 1205 may include a carrier sensing mechanism for each 20 MHz allocation of the operating bandwidth (for example, for a 320 MHz bandwidth, 16 NAV checks would be supported for each 20 MHz allocation). In other cases, the per-channel NAV check 1205 may include carrier sensing for one or more sets of sub-channels (for example, 80 MHz or 120 MHz channels) within the operating bandwidth.

Additionally or alternatively, the system corresponding to the EHT environment may be configured to include additional flexibility and support extensions based on the extended operating bandwidth. In some cases, one or more sub-channel allocations of the operating bandwidth may support an associated primary channel. For example, for a 320 MHz operating bandwidth, the system may be configured to support a first primary channel associated with the upper 160 MHz of the bandwidth and a second primary channel associated with the lower 160 MHz of the bandwidth. The one or more primary channels may support beacons which support duplication of management frame formats. In addition, the one or more primary channels may be configured with flexibility extensions associated with concurrent operations on traditional Wi-Fi frequency bands (for example, such as the 5 GHz band, the 2.4 GHz band, the 60 GHz band, the 3.6 GHz band, the 900 MHz band) and 6 GHz bandwidth spectrum, spanned by the operating bandwidth for EHT functionality. Each of the STAs 115 may observe the primary channels of the concurrent operations based in part on the supported functionality at the operating frequency band of the STA. For example, the STA 115-f may support operation and 5 GHz bandwidth spectrum. Based on the supported operation, the STA 115-f may observe the primary channel associated with the 5 GHz bandwidth spectrum. In other examples, the STA 115-f may support operation and 6 GHz bandwidth spectrum. Based on the supported operation, the STA 115-f may observe the primary channel associated with the 6 GHz bandwidth spectrum. Additionally or alternatively, in other examples, the STA 115-f may support extended capability (for example, compatible with concurrent operation) within the extended bandwidth may observe both the primary channel within the 5 GHz band and the 6 GHz band.

It should be understood that the described operating bandwidth and sub-channel allocations described in the provided examples for per-channel NAV operations are not limiting. Rather, extensions to flexibility and support for rules, structures, and signaling may vary dynamically to support an EHT environment. The extensions may include supported functionality for reporting bandwidth extensions beyond what is indicated in the current specification (for example 160 MHz for HE devices), in accordance with the IEEE 802.11ax or 802.11be amendments to the 802.11 set of standards. Additionally or alternatively, the extensions may include supported functionality for reporting bandwidth granularity or refinement within a reporting bandwidth smaller than that indicated in the current specification.

Figure 13:
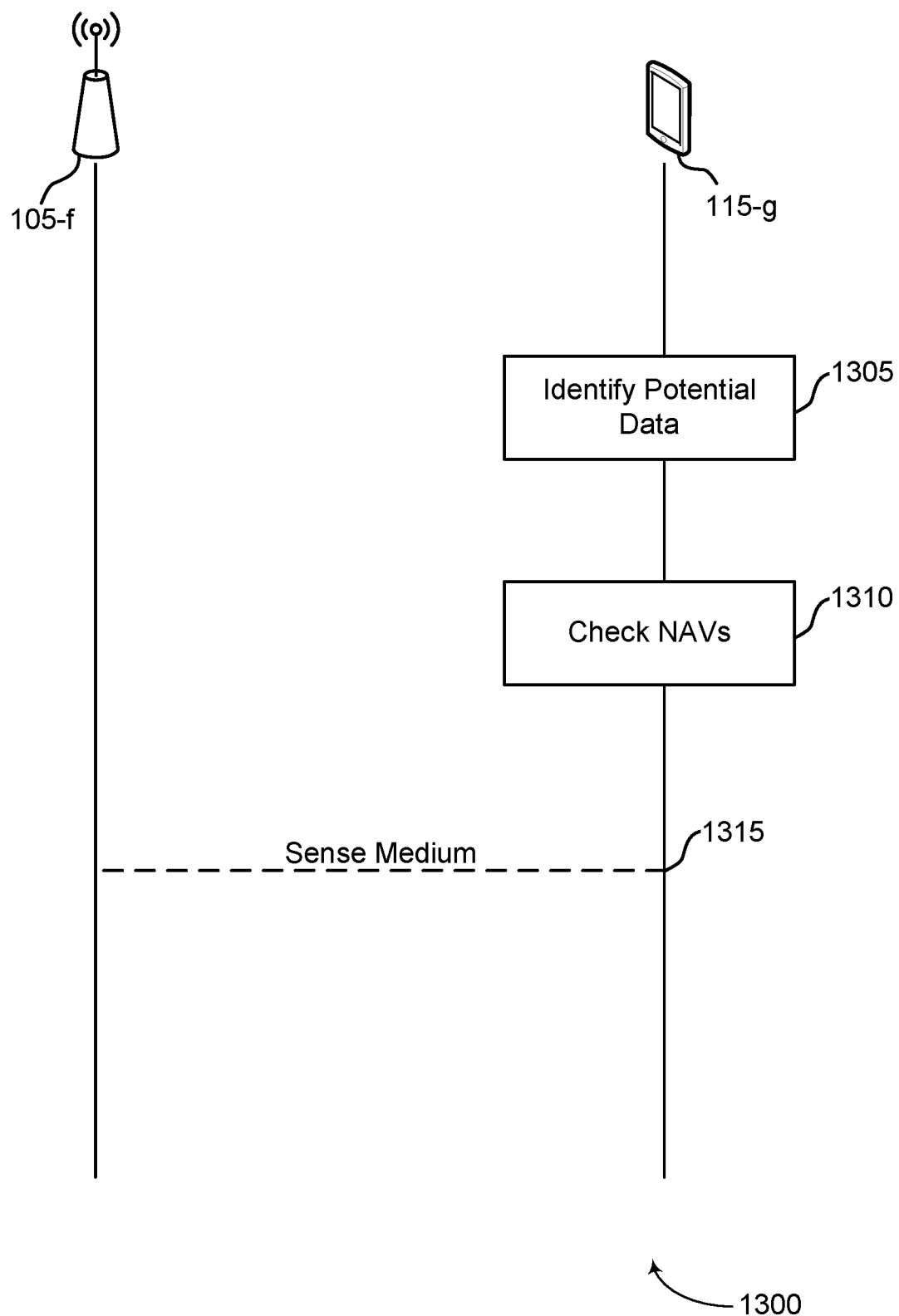
FIG. 13 shows an example of a process flow for communications between an AP and an STA that supports a 320 MHz operating bandwidth in accordance with aspects of the present disclosure.

FIG. 13 shows an example of a process flow 1300 for communications between an AP and an STA that supports a 320 MHz operating bandwidth in accordance with aspects of the present disclosure. Process flow 1300 may include one or more STAs 115 and APs 105 managing a BSS of the communication environment, as described with reference to FIG. 1. As described, added flexibility to supported functionality for carrier sensing mechanisms may be supported by an STA 115 of the environment, for increased granularity. The extensions to flexibility and supported functionality may be in accordance with EHT capability within the environment.

Process flow 1300 may illustrate support extensions for localized (for example, per-channel) NAV checking as part of medium sensing operation associated with allocated resources of an operating bandwidth. The operating bandwidth may be configured to include more than one primary channel based on supported flexibility extensions. For example, one or more sub-channel allocations of the operating bandwidth may support an associated primary channel. The one or more primary channels may support beacons that support duplication of management frame formats. In addition, the one or more primary channels may be configured with flexibility extensions associated with concurrent operations on traditional Wi-Fi frequency bands (for example, such as the 5 GHz band, the 2.4 GHz band, the 60 GHz band, the 3.6 GHz band, the 900 MHz band) and 6 GHz bandwidth spectrum, spanned by the operating bandwidth for EHT functionality.

At 1305, an STA 115-*g* may identify potential data for transmission to the access point 105-*f*, in which the access point 105-*f* supports communication on resources (such as one or more sub-channels) of an operating bandwidth. For example, the operating bandwidth may include one or more primary channels spanning spectrum included on traditional Wi-Fi frequency bands (for example, such as the 5 GHz band, the 2.4 GHz band, the 60 GHz band, the 3.6 GHz band, the 900 MHz band) or 6 GHz bandwidth spectrum.

At 1310, STA 115-*g* may monitor one or more NAVs associated with the one or more sub-channels of the allocated resources. The NAV monitoring may be performed by STA 115-*g* according to a bit value indication included in a carrier sense bit. In some cases, the NAV monitoring may include a carrier sensing mechanism for each 20 MHz allocation of the operating bandwidth (for example, for a 320 MHz bandwidth, 16 NAV monitoring (checks) would be supported for each 20 MHz allocation). In other cases, the NAV monitoring may include carrier sensing for one or more sets of sub-channels (for example, 80 MHz or 40 MHz channels) within the operating bandwidth. Based on the NAV monitoring, the STA 115-*g* may maintain a timer (or a "counter") for each of the one or more NAVs associated with the NAV monitoring. For example, for 320 MHz bandwidth with 16 NAVs supporting each 20 MHz allocation, the STA 115-*g* may maintain 16 separate timers.

At 1315, STA 115-*g* may sense the medium for at least one sub-channel of the allocated resources based on determining that one or more NAVs associated with one or more sub-channels are inactive. The one or more inactive NAVs may indicate that the associated spectrum is not occupied by data traffic from neighboring STAs 115, and that frame transmission may be initiated.

Figure 14:
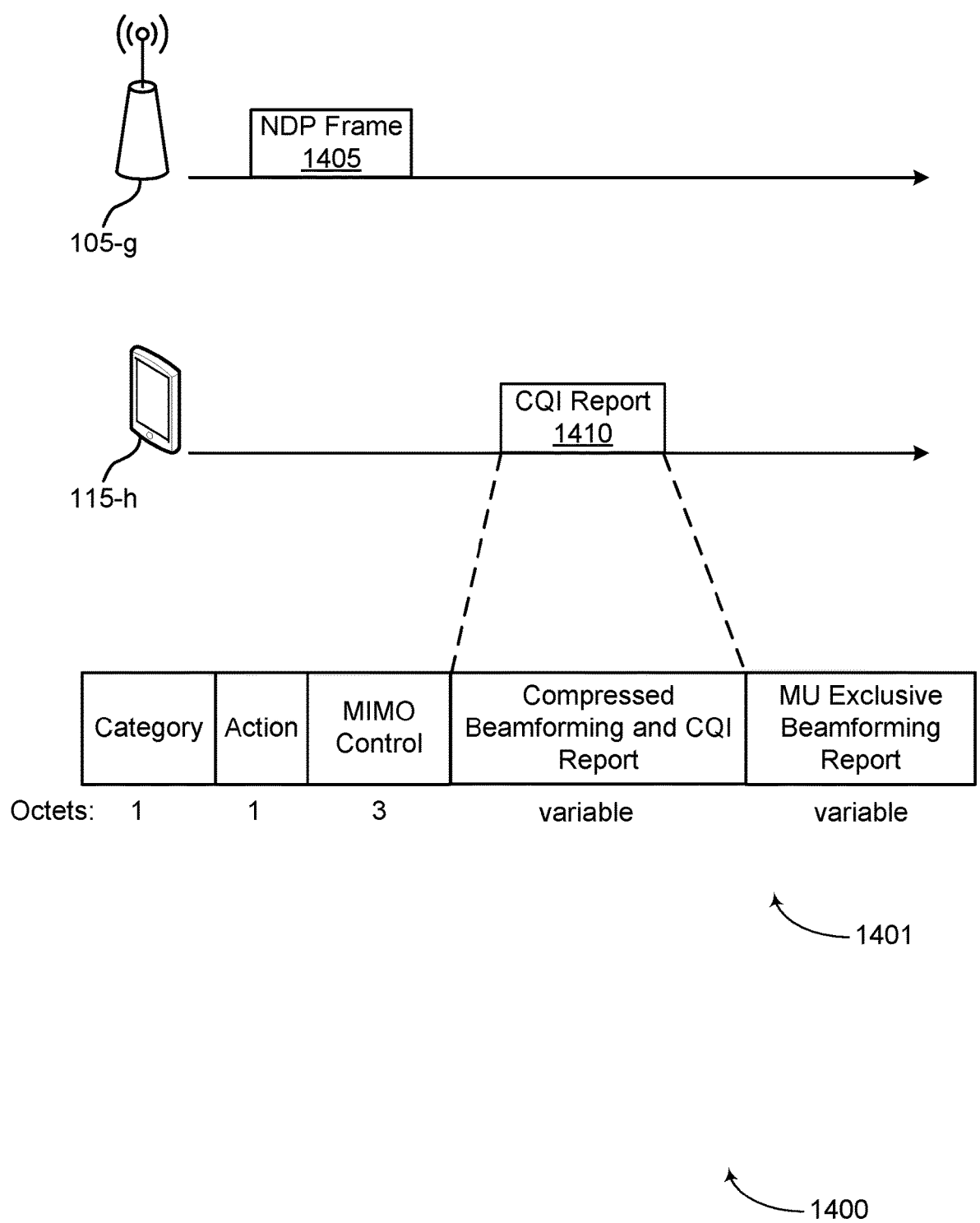
FIG. 14 shows an example of a schematic diagram for communications between an AP and an STA that supports a 320 MHz operating bandwidth in accordance with aspects of the present disclosure.

FIG. 14 shows an example of a schematic diagram 1400 that supports extensions for operating a large bandwidth BSS in accordance with aspects of the present disclosure. An AP 105-*g* may manage a BSS associated with resource allocation and communication for one or more STAs 115. Each of the STAs 115 may be served on one or more sub-channel allocations of the BSS and may be perceived as neighboring STAs relative to each STA 115.

An AP 105-*g* may signal one or more NDP frames (known as null packets) 1405 to STAs 115 on the managed BSS, including STA 115-*h*. The one or more null packets 1405 may span a wide bandwidth in accordance with the extended operating bandwidth. STA may process the null packets 1405 and determine a received signal strength associated with the transmission. The determination by the STA 115-*h* may be based on one or more characteristics associated with the received signal, including calculated signal-to-noise ratio (SNR) values. Based on the determination, STA 115-*h* may provide an uplink CQI indication corresponding to the transmitted null packets 1405. In some cases, the STA 115-*h* may be configured for EHT functionality and support enhancements to CQI reporting fields. STA 115-*h* may format a CQI report 1410 within a compressed beamforming and CQI report field. The compressed beamforming and CQI report field may be included within a compressed beamforming action frame 1401, spanning a sequence of octets. The size of the CQI report 1410 may be dependent on values indicated in the MIMO control field of the action frame.

Due to the extended operating bandwidth supported by EHT functionality, STA 115-*h* may provide unsolicited CQI report signaling to AP 105-*g*. The unsolicited CQI reporting may be provided in supplement with solicited CQI requested by AP 105-*g*. The unsolicited CQI reporting may aid the AP 105-*g* in efficiently scheduling STA 115-*h* within the enhanced bandwidth of the BSS. STA 115-*h* may enable indication for the unsolicited CQI report via a bit in an EHT OP element or by repurposing a reserved field of the action frame (for example, a reserved field in the MIMO control field). Alternatively, AP 105-*g* may indicate support for receiving an unsolicited CQI report via a bit indication formatted within an EHT capabilities element.

Further, based on the supported EHT functionality, STA 115-*h* may support enhanced granularity flexibility for CQI reporting associated with assigned resource units (RUs). Specifically, STA 115-*h* may enable a granular flexibility associated with tone resource allocations to support flexibility enhancements on the operating bandwidth. For example, in contrast to the current specification within the 802.11 set of standards, where CQI granularity is fixed to 26-tone RUs, STA 115-*h* may support an allocation granularity based on the overall operating bandwidth. For example, in some cases, STA 115-*h* may support a CQI report spanning a resource allocation spanning a larger tone granularity (for example, 52 tone, 106 tone, etc.) based on extended operating bandwidth. In other examples, STA 115-*h* may support a CQI report spanning a resource allocation spanning a smaller tone granularity due to refined resource assignment for the STA.

It should be understood that the described operating bandwidth and sub-channel allocations described in the provided examples for CQI report signaling are not limiting. Rather, extensions to flexibility and support for rules, structure, and signaling may be dynamically variant to support an EHT environment. The extensions may include supported functionality for reporting bandwidth extensions beyond what is indicated in the current specification (for example 160 MHz for HE devices), in accordance with the IEEE 802.11ax or 802.11be amendments to the 802.11 set of standards. Further, the extensions may include supported functionality for reporting bandwidth granularity or refinement within a reporting bandwidth smaller than that indicated in the current specification.

Figure 15:
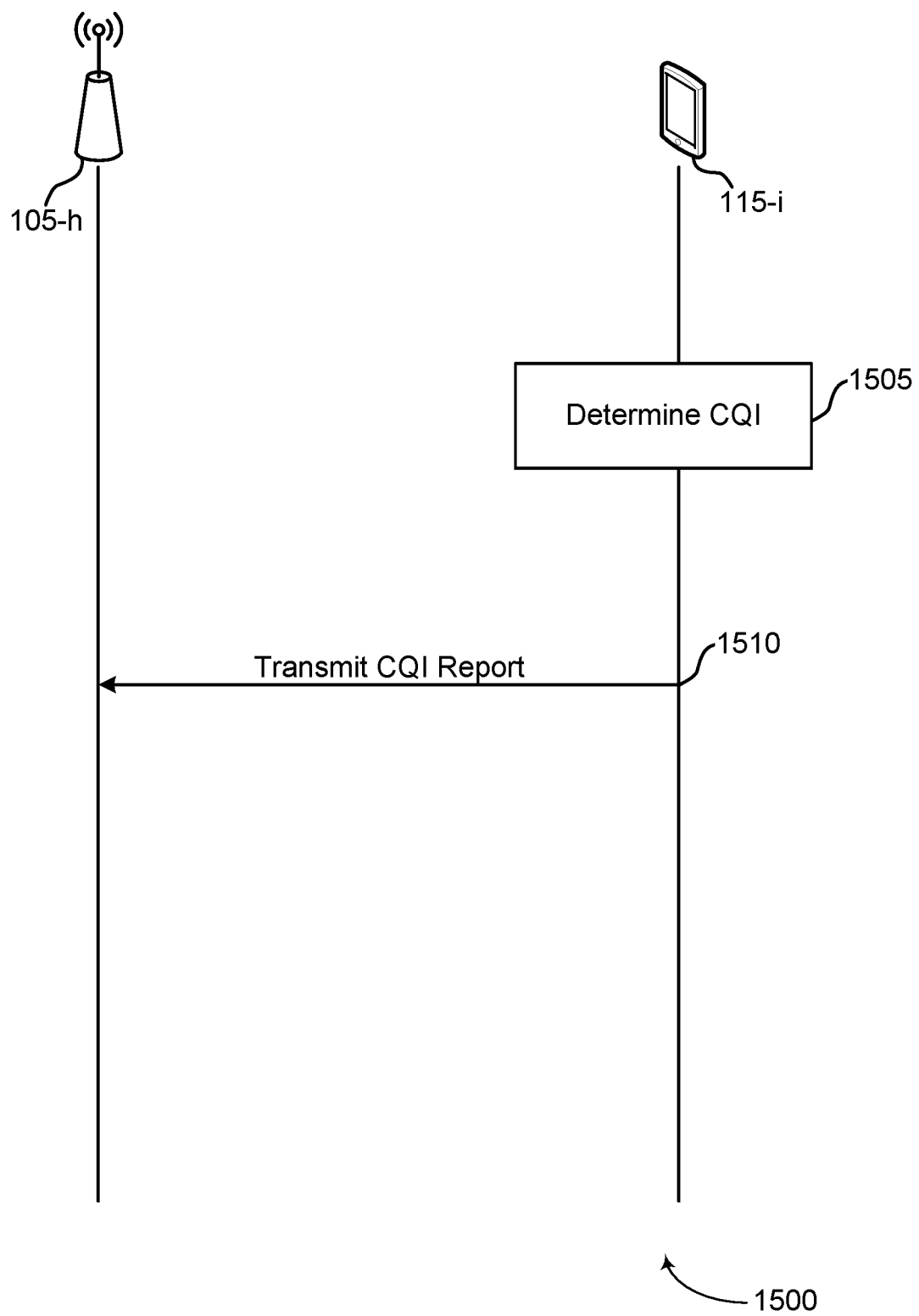
FIG. 15 shows an example of a process flow for communications between an AP and an STA that supports a 320 MHz operating bandwidth in accordance with aspects of the present disclosure.

FIG. 15 shows an example of a process flow 1500 that supports extensions for operating a large bandwidth BSS in accordance with aspects of the present disclosure. Process flow 1500 may include one or more STAs and APs managing a BSS of the communication environment, as described with reference to FIG. 1. As described, added flexibility to CQI reporting may be supported by an STA of the environment, for enhanced granularity. The extensions to flexibility and supported functionality may be in accordance with EHT capability within the environment.

Process flow 1500 may illustrate support extensions for flexible granularity associated with CQI reporting for allocated resources of an operating bandwidth. A CQI report may be included in a compressed beamforming and CQI report field for a compressed beamforming action frame. The size of the CQI report field may be dependent on values indicated in the MIMO control field of the action frame.

At 1505, an STA 115-*i* may process null packets received from AP 105-*h* and determine a CQI indication for sub-channels of the operating bandwidth. STA 115-*i* may determine a granularity of the CQI indication based on one or more of the operating bandwidth of STA 115-*i*, a bandwidth in a solicitation for the CQI, an operating bandwidth of AP 105-*h*, or a bandwidth of a response that includes the CQI report (for example, bandwidth of compressed beamforming action frame). Granularity of the CQI indication of the CQI report may be based on the overall bandwidth (for example, higher bandwidth including higher granularity, lower bandwidth including lower granularity).

AT 1510, STA 115-i may transmit the CQI report to AP 105-h as a report field of the action frame. In some cases, STA 115-i may transmit the CQI report based on a solicited CQI request indication provided by AP 105-h. In other cases, STA 115-i may transmit the CQI report unsolicited. An unsolicited mode for providing CQI indication at STA 115-i may be enabled via bit of an EHT OP element or by repurposing a field of the action frame (for example, a reserved field of the MIMO Control field). Alternatively, an unsolicited mode for providing CQI indication at STA 115-i may be enabled by indicated support for receiving unsolicited CQI at AP 105-h via a bit in an EHT capabilities element.

Figure 16:
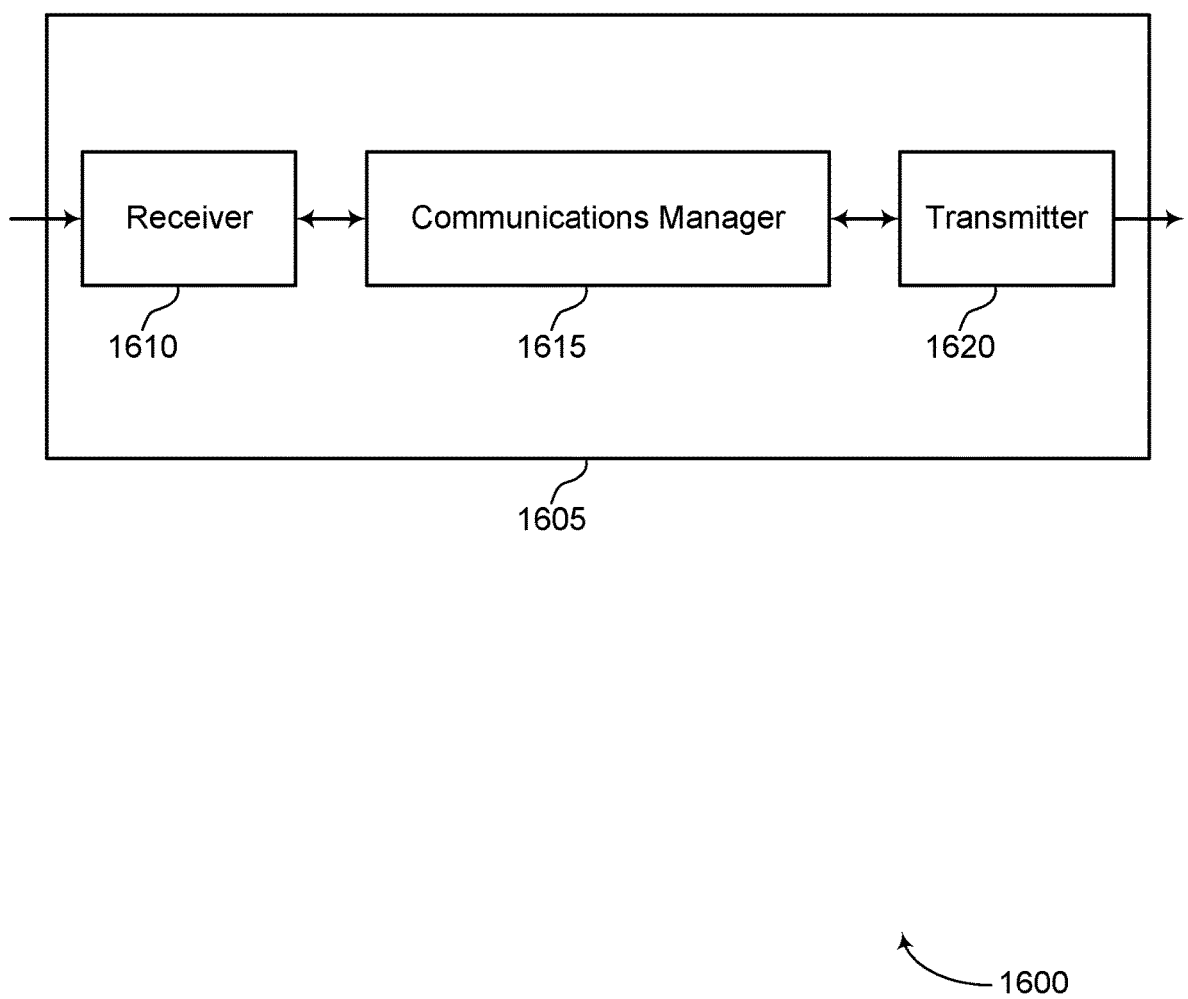
FIGS. 16 and 17 show block diagrams of devices for use in wireless communication that supports a 320 MHz operating bandwidth in accordance with aspects of the present disclosure.

FIG. 16 shows a block diagram 1600 of a device 1605 for use in wireless communication that supports 320 MHz operating bandwidth in accordance with aspects of the present disclosure. The device 1605 may be an example of aspects of a STA as described herein. The device 1605 may include a receiver 1610, a communications manager 1615, and a transmitter 1620. The device 1605 may also include a processor. Each of these components may be in communication with one another (for example, via one or more buses).

Receiver 1610 may receive information such as packets, user data, or control information associated with various information channels (for example, control channels, data channels, and information related to supporting 320 MHz operating bandwidth). Information may be passed on to other components of the device. The receiver 1610 may be an example of aspects of the transceiver 1920 described in FIG. 19. The receiver 1610 may utilize a single antenna or a set of antennas.

The communications manager 1615 may identify an operating mode for an operating bandwidth of the station, determine, based on the identified operating mode, a value for a parameter of a bandwidth query report (BQR) or a target wake time (TWT) element, and transmit the BQR or the TWT element including an indication of the determined value for the parameter. The communications manager 1415 may also receive a control transmission from an access point, identify an operating bandwidth of the station, and determine one or more of a channel width, or an uplink bandwidth, or a resource unit allocation, for the station indicated by the received control transmission based on the identified operating bandwidth of the station. The communications manager 1615 may be an example of aspects of the communications manager 1715 described herein.

The communications manager 1615, or its sub-components, may be implemented in hardware or code (for example, software or firmware) executed by a processor. If implemented in code executed by a processor, the functions of the communications manager 1615, or its sub-components may be executed by one or more of a general-purpose processor, a DSP, an application-specific integrated circuit (ASIC), a FPGA or other programmable logic device, discrete gate or transistor logic, discrete hardware components designed to perform the functions described in the present disclosure.

The communications manager 1615, or its sub-components, may be physically located at different locations, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, another computing device, of one or more other components described in the present disclosure.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1920 described in FIG. 19. The transmitter 1620 may utilize a single antenna or a set of antennas.

Figure 17:
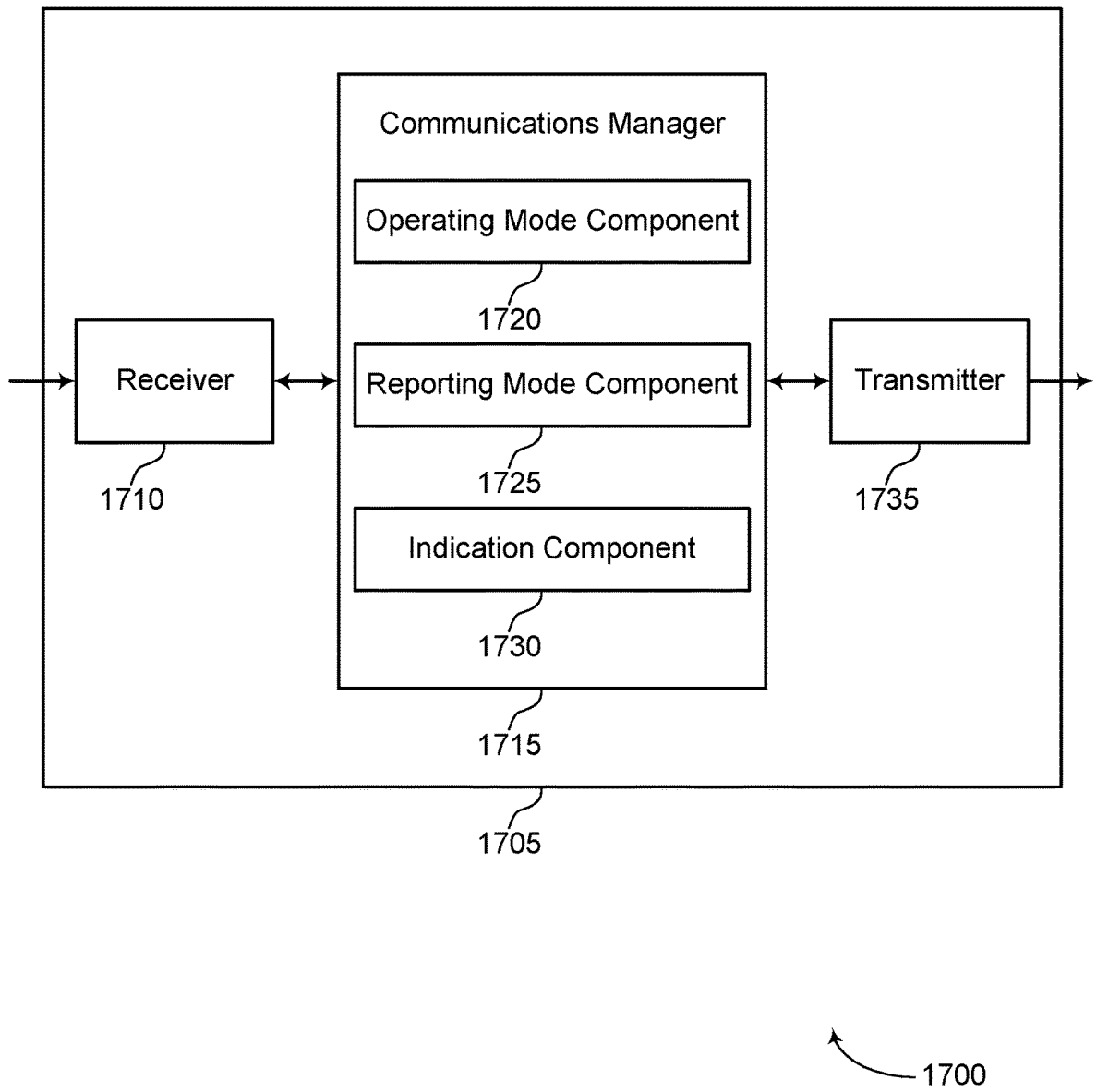

FIG. 17 shows a block diagram 1700 of a device 1705 for use in wireless communication that supports 320 MHz operating bandwidth in accordance with aspects of the present disclosure. The device 1705 may be an example of aspects of a device 1605 or a STA 115 as described herein. The device 1705 may include a receiver 1710, a communications manager 1715, and a transmitter 1735. The device 1705 may also include a processor. Each of these components may be in communication with one another (for example, via one or more buses).

Receiver 1710 may receive information such as packets, user data, or control information associated with various information channels (for example, control channels, data channels, and information related to supporting 320 MHz operating bandwidth). Information may be passed on to other components of the device. The receiver 1710 may be an example of aspects of the transceiver 1920 described in FIG. 19. The receiver 1510 may utilize a single antenna or a set of antennas.

The communications manager 1715 may be an example of aspects of the communications manager 1715 as described herein. The communications manager 1715 may include an operating mode component 1720, a reporting mode component 1725, and an indication component 1730. The communications manager 1715 may be an example of aspects of the communications manager 1615 described herein.

The operating mode component 1720 may identify an operating mode for an operating bandwidth of the station. The operating mode component 1720 may identify an operating bandwidth of the station.

The reporting mode component 1725 may determine, based on the identified operating mode, a value for a parameter of a bandwidth query report (BQR) or a target wake time (TWT) element.

The indication component 1730 may determine one or more of a channel width, or an uplink bandwidth, or a resource unit allocation, for the station indicated by the received control transmission based on the identified operating bandwidth of the station.

Transmitter 1735 may transmit signals generated by other components of the device. In some examples, the transmitter 1735 may be collocated with a receiver 1710 in a transceiver module. For example, the transmitter 1735 may be an example of aspects of the transceiver 1920 described in FIG. 19. The transmitter 1735 may utilize a single antenna or a set of antennas.

Figure 18:
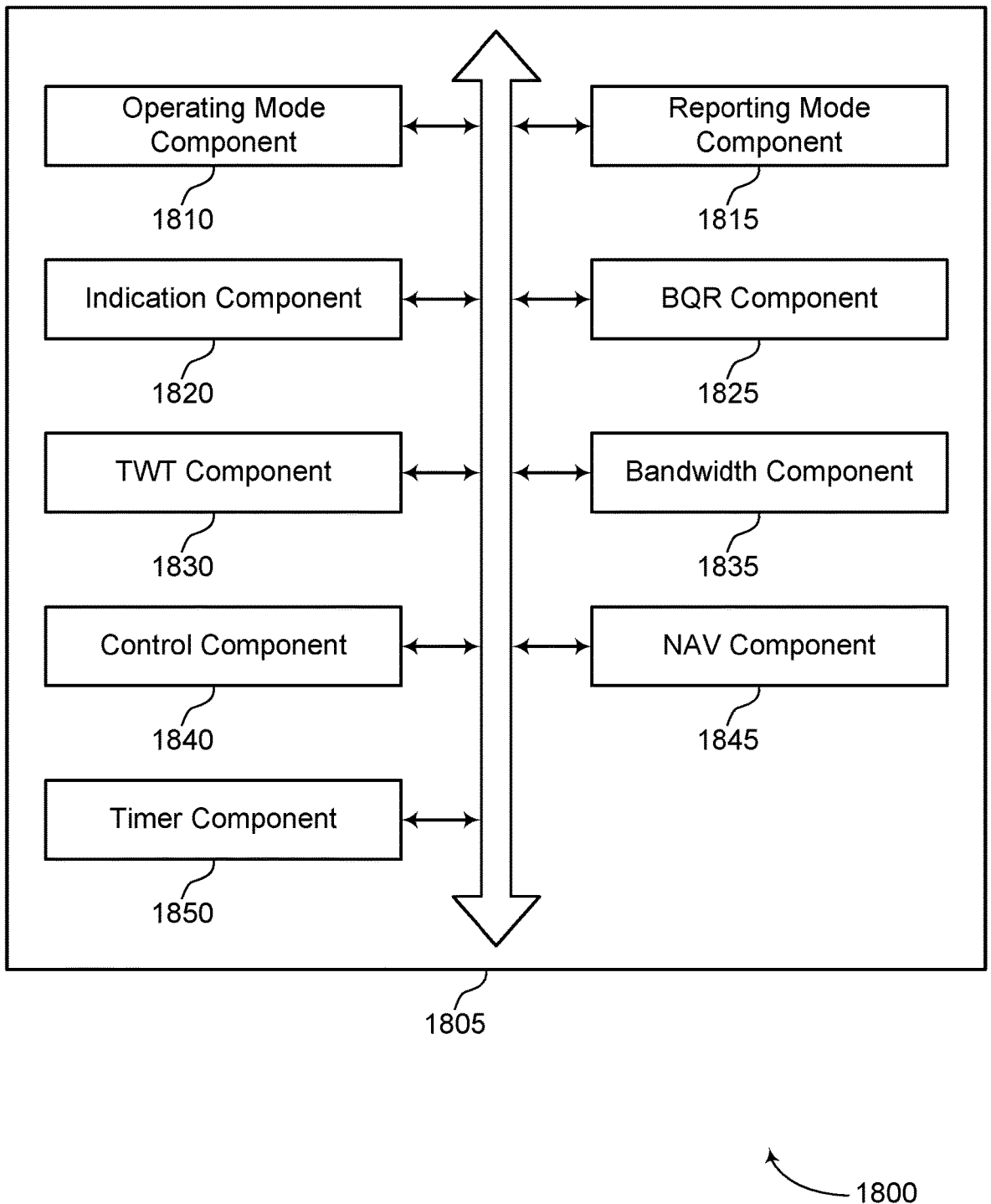
FIG. 18 shows a block diagram of a communications manager for use in wireless communication that supports a 320 MHz operating bandwidth in accordance with aspects of the present disclosure.

FIG. 18 shows a block diagram 1800 of a communications manager 1805 for use in wireless communication that supports 320 MHz operating bandwidth in accordance with aspects of the present disclosure. The communications manager 1805 may be an example of aspects of a communications manager 1615 or a communications manager 1715 described herein. The communications manager 1805 may include an operating mode component 1810, a reporting mode component 1815, an indication component 1820, a BQR component 1825, a TWT component 1830, a bandwidth component 1835, a control component 1840, a NAV component 1845, and a timer component 1850. Each of these modules may communicate, directly or indirectly, with one another (for example, via one or more buses).

The operating mode component 1810 may identify an operating mode for an operating bandwidth of the station. In some examples, the operating mode component 1810 may determine, based on the identified operating mode, a value for a parameter of a second BQR or a second TWT element.

The reporting mode component 1815 may determine, based on the identified operating mode, a value for a parameter of a bandwidth query report (BQR) or a target wake time (TWT) element. In some examples, the reporting mode component 1815 may identify that the station has data for transmission to an access point, the access point supporting communication on one or more sub-channels of the operating bandwidth of the station.

The indication component 1820 may transmit the BQR or the TWT element including an indication of the determined value for the parameter. In some examples, the indication component 1820 may transmit the second BQR or the second TWT element including an indication of the determined value for the parameter. In some examples, the indication component 1820 may transmit feedback for the one or more NAVs based on the sensing.

The BQR component 1825 may receive a request for the BQR, where the BQR is transmitted in response to the received request. In some examples, the value for the parameter of the BQR includes an indication of a sub-channel of the operating bandwidth available at the station. In some examples, the transmitted BQR includes an indication of a duration of time for which the BQR is valid. In some examples, the indication of the duration of time indicates that the BQR does not expire.

In some examples, the indication of the duration of time indicates that the BQR is valid for a duration of a current transmission opportunity, or a multi-user (MU) enhanced distributed coordination function (DCF) channel access (EDCA) parameter set duration, or a target wake time (TWT) service period duration, or a combination thereof. In some examples, the indication of the duration of time indicates an explicit duration of time.

The TWT component 1830 may determine that the value for the parameter of the TWT element includes an indication of a sub-channel of the operating bandwidth available at the station. In some examples, the value for the parameter of the TWT element identifies a secondary sub-channel of the operating bandwidth of the station.

The bandwidth component 1835 may determine one or more of a channel width, an uplink bandwidth, or a resource unit allocation for the station based on the operating bandwidth of the station.

In some examples, the value for the bandwidth parameter of the BQR or the TWT element includes an indication of a duration of time that one or more sub-channels of the operating bandwidth of the station is to be busy or available. In some examples, a granularity of the indication in the BQR or the TWT element is based on the operating bandwidth of the station, or a bandwidth supported by the station, or a bandwidth supported by a device receiving the BQR or the TWT element, or a bandwidth specified by a request for the BQR, or bandwidth indicated in the BQR, or a combination thereof.

In some examples, the operating bandwidth of the station includes 320 MHz, the BQR or the TWT element is associated with a first portion of the operating bandwidth, and the second BQR or the second TWT element is associated with a second portion of the operating bandwidth. In some examples, the operating bandwidth of the station includes 320 MHz, and the operating mode is a 20 MHz operating mode, or a 40 MHz operating mode, or 80 MHz operating mode, or an 80+80 MHz operating mode, or a 160 MHz operating mode, or a 320 MHz operating mode, or a 160+ 160 MHz operating mode. In some examples, the operating bandwidth includes one or more primary channels, the one or more sub-channels including the one or more primary channels.

The control component 1840 may receive a control transmission from an access point, where the identifying is based at least in part the control transmission. In some examples, identifying at least one field in a common information field of the control transmission as indicating the uplink bandwidth or the resource unit allocation for the station based on the identified operating bandwidth of the station, where the received control transmission includes a trigger frame.

The NAV component 1845 may monitor one or more network allocation vectors (NAVs) for the one or more respective sub-channels of the operating bandwidth of the station. In some examples, the NAV component 1845 may sense a medium for the one or more sub-channels based on determining that one or more NAVs for the one or more sub-channels have expired. The timer component 1850 may maintain a timer for each NAV of the one or more NAVs based on the monitoring.

Figure 19:
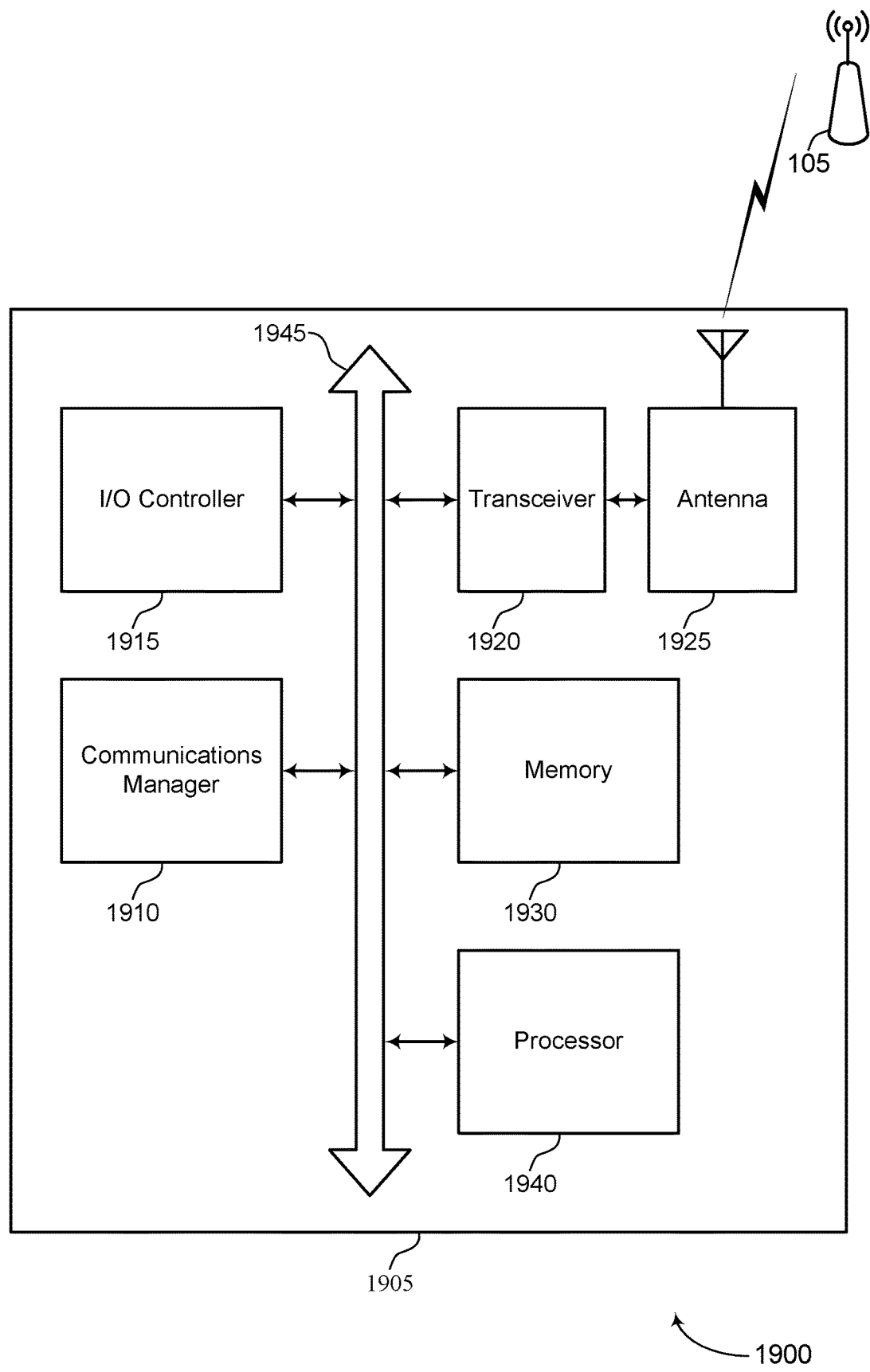
FIG. 19 shows a diagram of a system including a device for use in wireless communication that supports a 320 MHz operating bandwidth in accordance with aspects of the present disclosure.

FIG. 19 shows a diagram of a system 1900 including a device 1905 for use in wireless communication that supports 320 MHz operating bandwidth in accordance with aspects of the present disclosure. The device 1905 may be an example of or include the components of device 1605, device 1705, or a STA 115 as described herein. The device 1705 may include components for bi-directional voice and data communications including components for transmitting and receiving communications, including a communications manager 1910, an I/O controller 1915, a transceiver 1920, an antenna 1925, memory 1930, and a processor 1940. These components may be in electronic communication via one or more buses (for example, bus 1945).

The communications manager 1910 may identify an operating mode for an operating bandwidth of the station, determine, based on the identified operating mode, a value for a parameter of a bandwidth query report (BQR) or a target wake time (TWT) element, and transmit the BQR or the TWT element including an indication of the determined value for the parameter.

In some examples, the communications manager 1910 may also receive a control transmission from an access point, identify an operating bandwidth of the station, and determine a channel width, or an uplink bandwidth, or a resource unit allocation, for the station indicated by the received control transmission based on the identified operating bandwidth of the station.

I/O controller 1915 may manage input and output signals for device 1905. I/O controller 1915 may also manage peripherals not integrated into device 1905. In some examples, I/O controller 1915 may represent a physical connection or port to an external peripheral. In some examples, I/O controller 1915 may utilize an operating system such as iOS®, ANDROID®, MS-DOS®, MS-WINDOWS®, OS/2®, UNIX®, LINUX®, or another known operating system. In other cases, I/O controller 1715 may represent or interact with a modem, a keyboard, a mouse, a touchscreen, or a similar device. In some examples, I/O controller 1915 may be implemented as part of a processor. In some examples, a user may interact with device 1905 via I/O controller 1915 or via hardware components controlled by I/O controller 1915.

Transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some examples, the wireless device may include a single antenna 1925. However, in some examples the device may have more than one antenna 1925, which may be capable of concurrently transmitting or receiving multiple wireless transmissions.

Memory 1930 may include RAM and ROM. The memory 1930 may store computer-readable, computer-executable software 1935 including instructions that, when executed, cause the processor to perform various functions described herein. In some examples, the memory 1930 may contain, among other things, a BIOS which may control basic hardware or software operation such as the interaction with peripheral components or devices.

Processor 1940 may include an intelligent hardware device, (for example, one or more of a general-purpose processor, a DSP, a CPU, a microcontroller, an ASIC, an FPGA, a programmable logic device, a discrete gate or transistor logic component, a discrete hardware component). In some examples, processor 1940 may be configured to operate a memory array using a memory controller. In other cases, a memory controller may be integrated into processor 1940. Processor 1940 may be configured to execute computer-readable instructions stored in a memory to perform various functions (for example, functions or tasks supporting 320 MHz operating bandwidth).

Figure 20:
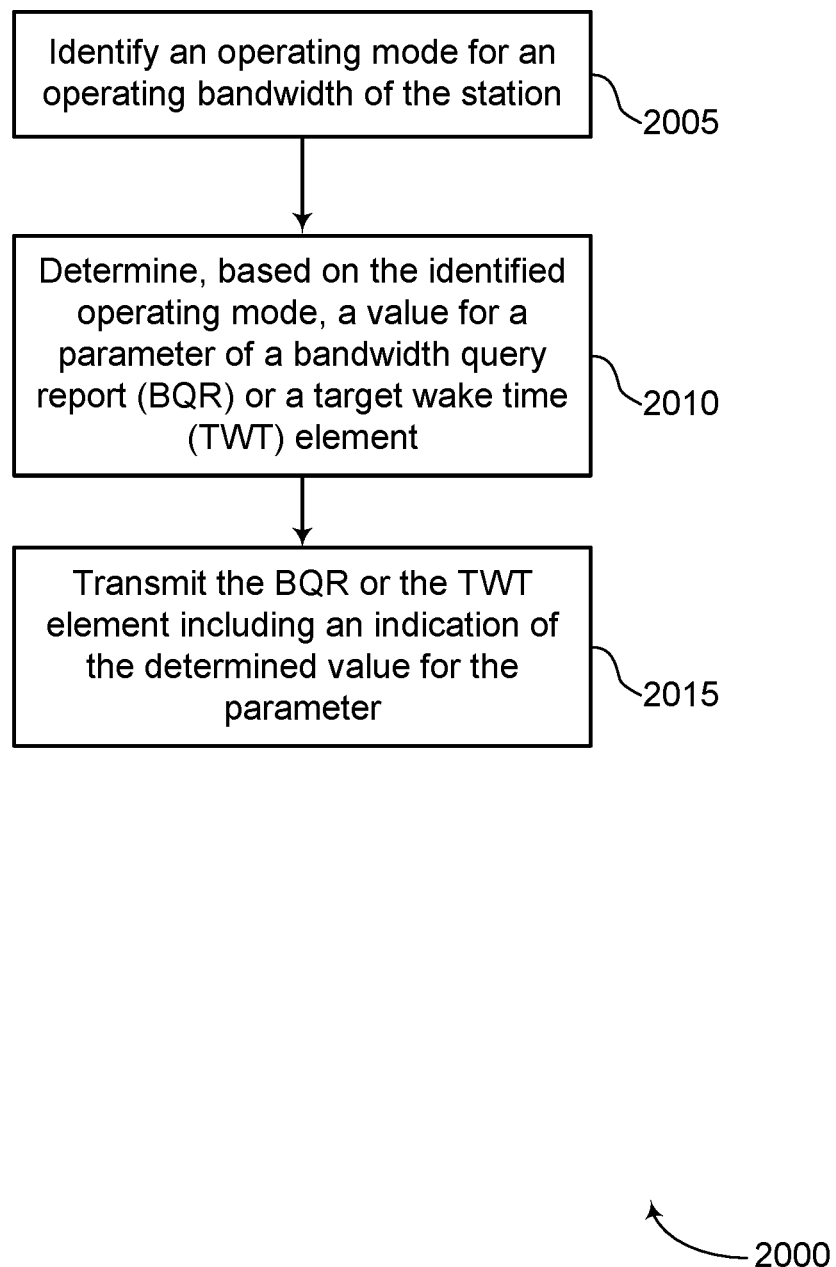
FIGS. 20-27 show flowcharts illustrating methods for use in wireless communication that supports a 320 MHz operating bandwidth in accordance with aspects of the present disclosure.

FIG. 20 shows a flowchart illustrating a method 2000 for use in wireless communication that supports 320 MHz operating bandwidth in accordance with aspects of the present disclosure. The operations of method 2000 may be implemented by a STA or its components as described herein. For example, the operations of method 2000 may be performed by a communications manager as described in FIGS. 16-19. In some examples, a STA may execute a set of instructions to control the functional elements of the STA to perform the functions described below. Additionally or alternatively, a STA may perform aspects of the functions described below using special-purpose hardware.

At 2005, the STA may identify an operating mode for an operating bandwidth of the station. The operations of 2005 may be performed according to the methods described herein. In some examples, aspects of the operations of 2005 may be performed by an operating mode component as described in FIGS. 16-19.

At 2010, the STA may determine, based on the identified operating mode, a value for a parameter of a bandwidth query report (BQR) or a target wake time (TWT) element. The operations of 2010 may be performed according to the methods described herein. In some examples, aspects of the operations of 2010 may be performed by a reporting mode component as described in FIGS. 16-19.

At 2015, the STA may transmit the BQR or the TWT element including an indication of the determined value for the parameter. The operations of 2015 may be performed according to the methods described herein. In some examples, aspects of the operations of 2015 may be performed by a transmitter as described in FIGS. 16-19.

Figure 21:
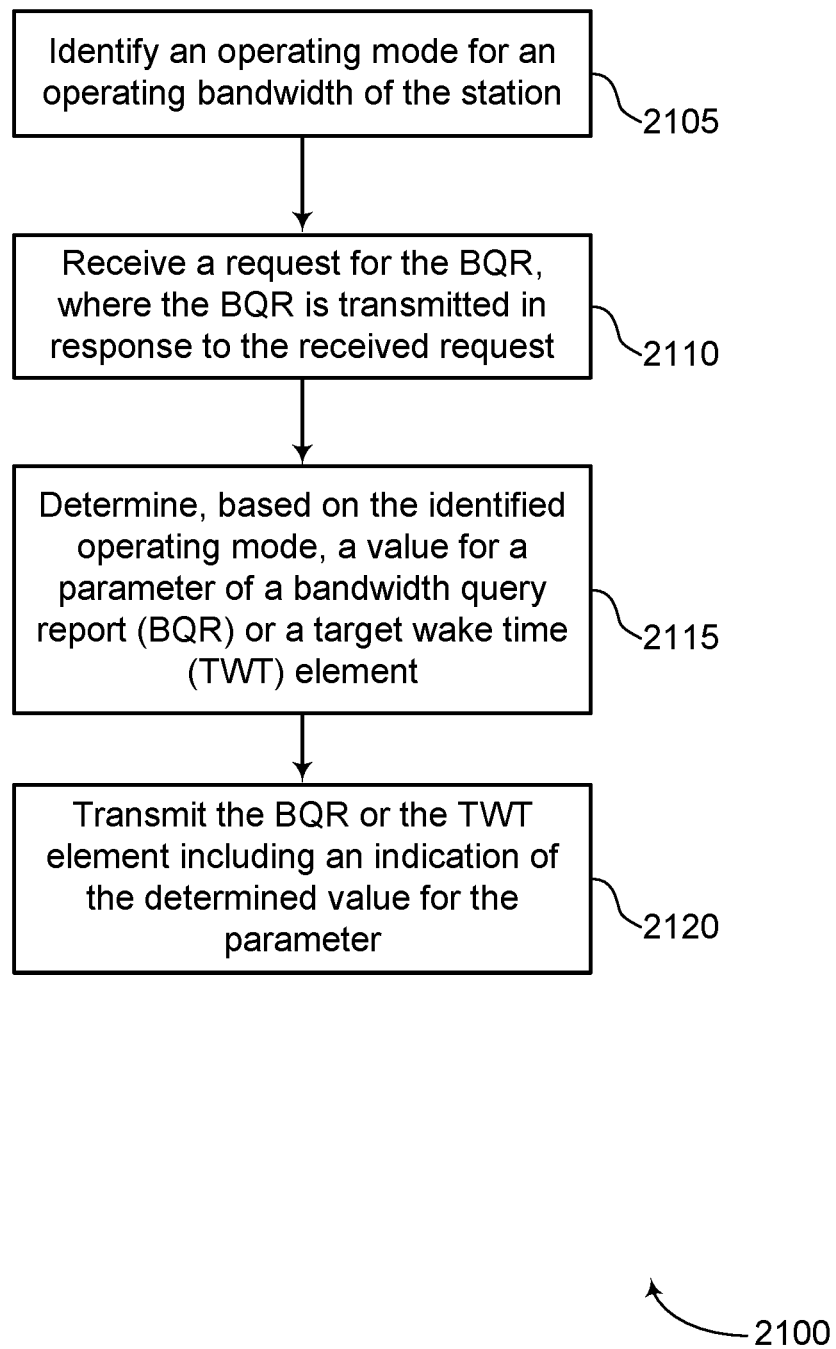

FIG. 21 shows a flowchart illustrating a method 2100 for use in wireless communication that supports 320 MHz operating bandwidth in accordance with aspects of the present disclosure. The operations of method 2100 may be implemented by a STA or its components as described herein. For example, the operations of method 2100 may be performed by a communications manager as described in FIGS. 16-19. In some examples, a STA may execute a set of instructions to control the functional elements of the STA to perform the functions described below. Additionally or alternatively, a STA may perform aspects of the functions described below using special-purpose hardware.

At 2105, the STA may identify an operating mode for an operating bandwidth of the station. The operations of 2105 may be performed according to the methods described herein. In some examples, aspects of the operations of 2105 may be performed by an operating mode component as described in FIGS. 16-19.

At 2110, the STA may receive a request for the BQR, in which the BQR is transmitted in response to the received request. The operations of 2110 may be performed according to the methods described herein. In some examples, aspects of the operations of 2110 may be performed by a receiver as described in FIGS. 16-19.

At 2115, the STA may determine, based on the identified operating mode, a value for a parameter of a bandwidth query report (BQR) or a target wake time (TWT) element. The operations of 2115 may be performed according to the methods described herein. In some examples, aspects of the operations of 1915 may be performed by a reporting mode component as described in FIGS. 16-19.

At 2120, the STA may transmit the BQR or the TWT element including an indication of the determined value for the parameter. The operations of 2120 may be performed according to the methods described herein. In some examples, aspects of the operations of 2120 may be performed by a transmitter as described in FIGS. 16-19.

Figure 22:
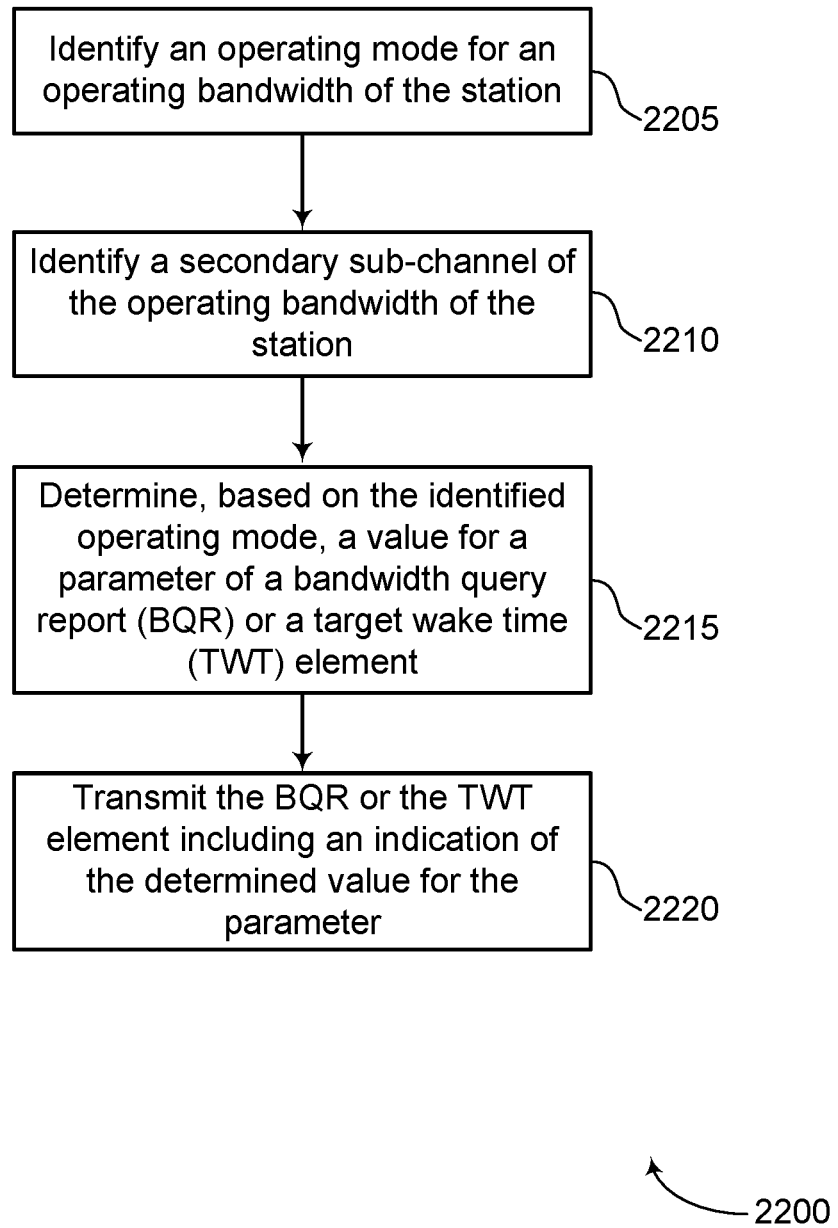

FIG. 22 shows a flowchart illustrating a method 2200 for use in wireless communication that supports 320 MHz operating bandwidth in accordance with aspects of the present disclosure. The operations of method 2200 may be implemented by a STA or its components as described herein. For example, the operations of method 2200 may be performed by a communications manager as described in FIGS. 16-19. In some examples, a STA may execute a set of instructions to control the functional elements of the STA and to perform the functions described below. Additionally or alternatively, the STA may perform aspects of the functions described below using special-purpose hardware.

At 2205, the STA may identify an operating mode for an operating bandwidth of the station. The operations of 2205 may be performed according to the methods described herein. In some examples, aspects of the operations of 2005 may be performed by an operating mode component as described in FIGS. 16-19.

At 2210, the STA may identify a secondary sub-channel of the operating bandwidth of the station. The operations of 2210 may be performed according to the methods described herein. In some examples, aspects of the operations of 2210 may be performed by a TWT component as described in FIG. 18.

At 2215, the STA may determine, based on the identified operating mode, a value for a parameter of a bandwidth query report (BQR) or a target wake time (TWT) element.

The operations of 2215 may be performed according to the methods described herein. In some examples, aspects of the operations of 2015 may be performed by a reporting mode component as described in FIGS. 16-19.

At 2220, the STA may transmit the BQR or the TWT element including an indication of the determined value for the parameter. The operations of 2220 may be performed according to the methods described herein. In some examples, aspects of the operations of 2220 may be performed by a transmitter as described in FIGS. 16-19.

Figure 23:
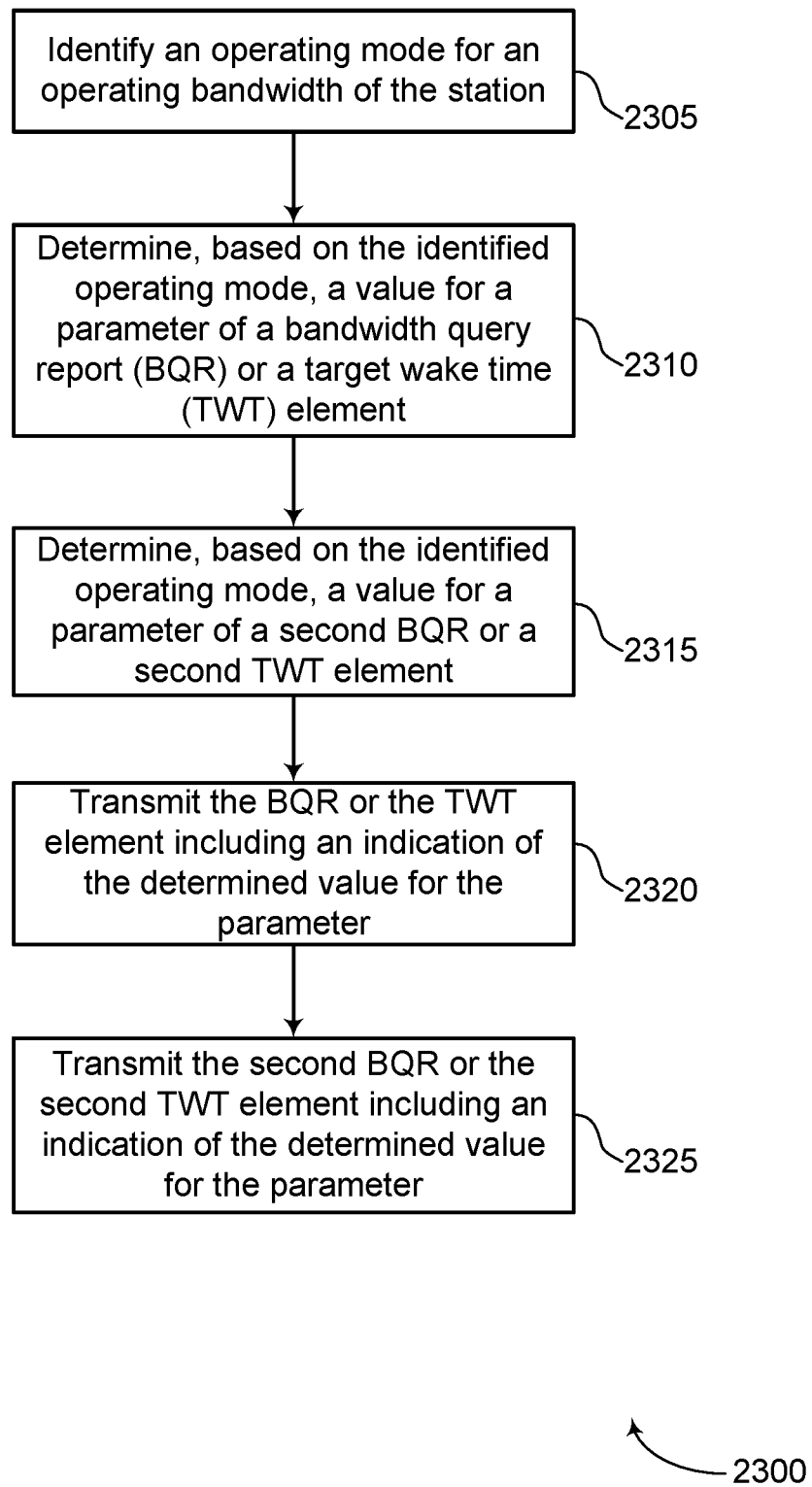

FIG. 23 shows a flowchart illustrating a method 2300 for use in wireless communication that supports a 320 MHz operating bandwidth in accordance with aspects of the present disclosure. The operations of method 2300 may be implemented by a STA or its components as described herein. For example, the operations of method 2300 may be performed by a communications manager as described with reference to FIGS. 16-19. In some examples, a STA may execute a set of instructions to control the functional elements of the STA to perform the functions described below. Additionally or alternatively, a STA may perform aspects of the functions described below using special-purpose hardware.

At 2305, the STA may identify an operating mode for an operating bandwidth of the station. The operations of 2305 may be performed according to the methods described herein. In some examples, aspects of the operations of 2305 may be performed by an operating mode component as described with reference to FIGS. 16-19.

At 2310, the STA may determine, based on the identified operating mode, a value for a parameter of a bandwidth query report (BQR) or a target wake time (TWT) element. The operations of 2310 may be performed according to the methods described herein. In some examples, aspects of the operations of 2310 may be performed by a reporting mode component as described with reference to FIGS. 16-19.

At 2315, the STA may determine, based on the identified operating mode, a value for a parameter of a second BQR or a second TWT element. The operations of 2315 may be performed according to the methods described herein. In some examples, aspects of the operations of 2315 may be performed by an operating mode component as described with reference to FIGS. 16-19.

At 2320, the STA may transmit the BQR or the TWT element including an indication of the determined value for the parameter. The operations of 2320 may be performed according to the methods described herein. In some examples, aspects of the operations of 2320 may be performed by an indication component as described with reference to FIGS. 16-19.

At 2325, the STA may transmit the second BQR or the second TWT element including an indication of the determined value for the parameter. The operations of 2325 may be performed according to the methods described herein. In some examples, aspects of the operations of 2325 may be performed by an indication component as described with reference to FIGS. 16-19.

Figure 24:
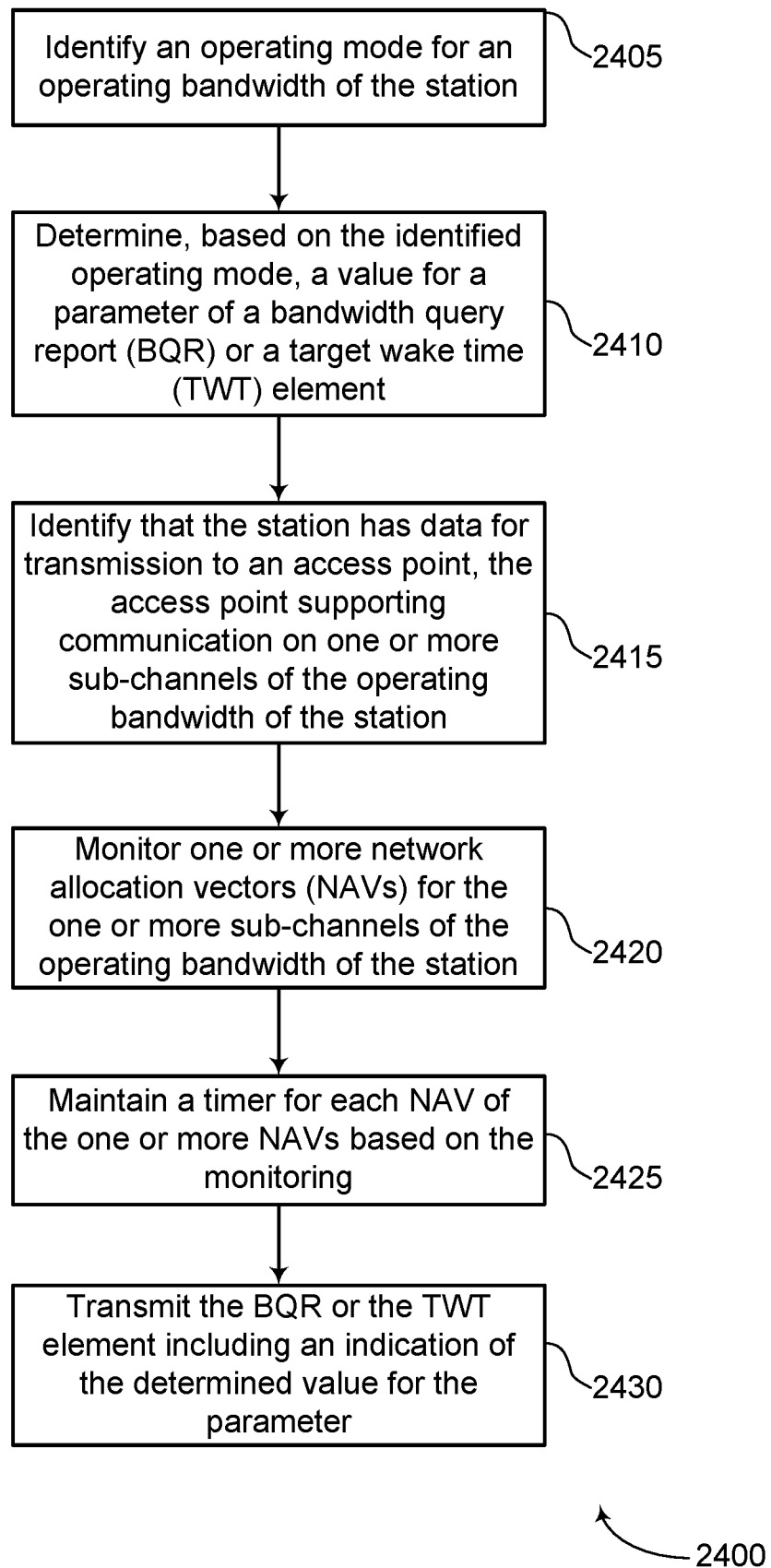

FIG. 24 shows a flowchart illustrating a method 2400 for use in wireless communication that supports supporting 322 MHz operating bandwidth in accordance with aspects of the present disclosure. The operations of method 2400 may be implemented by a STA or its components as described herein. For example, the operations of method 2400 may be performed by a communications manager as described with reference to FIGS. 16-19. In some examples, a STA may execute a set of instructions to control the functional elements of the STA to perform the functions described below. Additionally or alternatively, a STA may perform aspects of the functions described below using special-purpose hardware.

At 2405, the STA may identify an operating mode for an operating bandwidth of the station. The operations of 2405 may be performed according to the methods described herein. In some examples, aspects of the operations of 2405 may be performed by an operating mode component as described with reference to FIGS. 16-19.

At 2410, the STA may determine, based on the identified operating mode, a value for a parameter of a bandwidth query report (BQR) or a target wake time (TWT) element. The operations of 2410 may be performed according to the methods described herein. In some examples, aspects of the operations of 2410 may be performed by a reporting mode component as described with reference to FIGS. 16-19.

At 2415, the STA may identify that the station has data for transmission to an access point, the access point supporting communication on one or more sub-channels of the operating bandwidth of the station. The operations of 2415 may be performed according to the methods described herein. In some examples, aspects of the operations of 2415 may be performed by a reporting mode component as described with reference to FIGS. 16-19.

At 2420, the STA may monitor one or more network allocation vectors (NAVs) for the one or more sub-channels of the operating bandwidth of the station. The operations of 2420 may be performed according to the methods described herein. In some examples, aspects of the operations of 2420 may be performed by a NAV component as described with reference to FIGS. 16-19.

At 2425, the STA may maintain a timer for each NAV of the one or more NAVs based on the monitoring. The operations of 2425 may be performed according to the methods described herein. In some examples, aspects of the operations of 2425 may be performed by a timer component as described with reference to FIGS. 16-19.

At 2430, the STA may transmit the BQR or the TWT element including an indication of the determined value for the parameter. The operations of 2430 may be performed according to the methods described herein. In some examples, aspects of the operations of 2430 may be performed by an indication component as described with reference to FIGS. 16-19.

Figure 25:
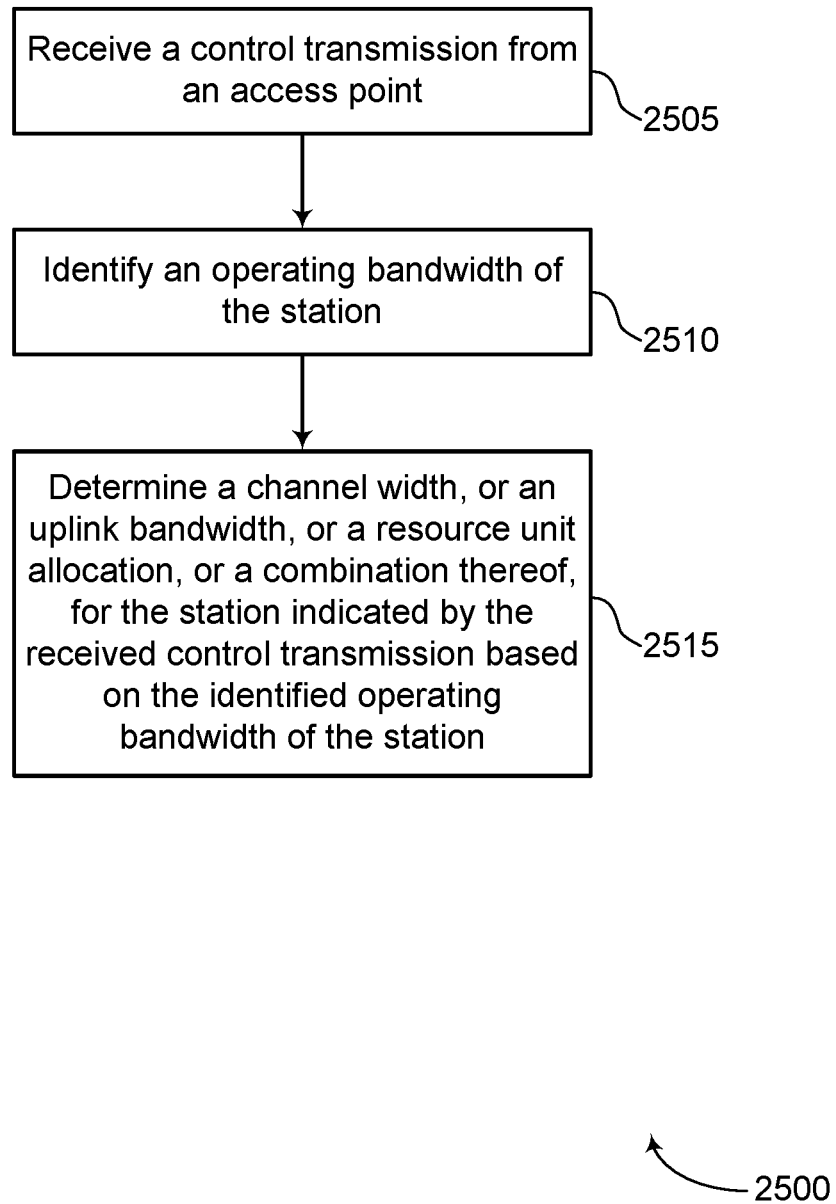

FIG. 25 shows a flowchart illustrating a method 2500 for use in wireless communication that supports 320 MHz operating bandwidth in accordance with aspects of the present disclosure. The operations of method 2500 may be implemented by a STA or its components as described herein. For example, the operations of method 2500 may be performed by a communications manager as described in FIGS. 16-19. In some examples, a STA may execute a set of instructions to control the functional elements of the STA to perform the functions described below. Additionally or alternatively, a STA may perform aspects of the functions described below using special-purpose hardware.

At 2505, the STA may receive a control transmission from an access point. The operations of 2505 may be performed according to the methods described herein. In some examples, aspects of the operations of 2505 may be performed by a receiver as described in FIGS. 16-19.

At 2510, the STA may identify an operating bandwidth of the station. The operations of 2510 may be performed according to the methods described herein. In some examples, aspects of the operations of 2510 may be performed by an operating mode component as described in FIGS. 16-19.

At 2515, the STA may determine one or more of a channel width, or an uplink bandwidth, or a resource unit allocation, for the station indicated by the received control transmission based on the identified operating bandwidth of the station. The operations of 2515 may be performed according to the methods described herein. In some examples, aspects of the operations of 2515 may be performed by a control component as described in FIGS. 16-19.

Figure 26:
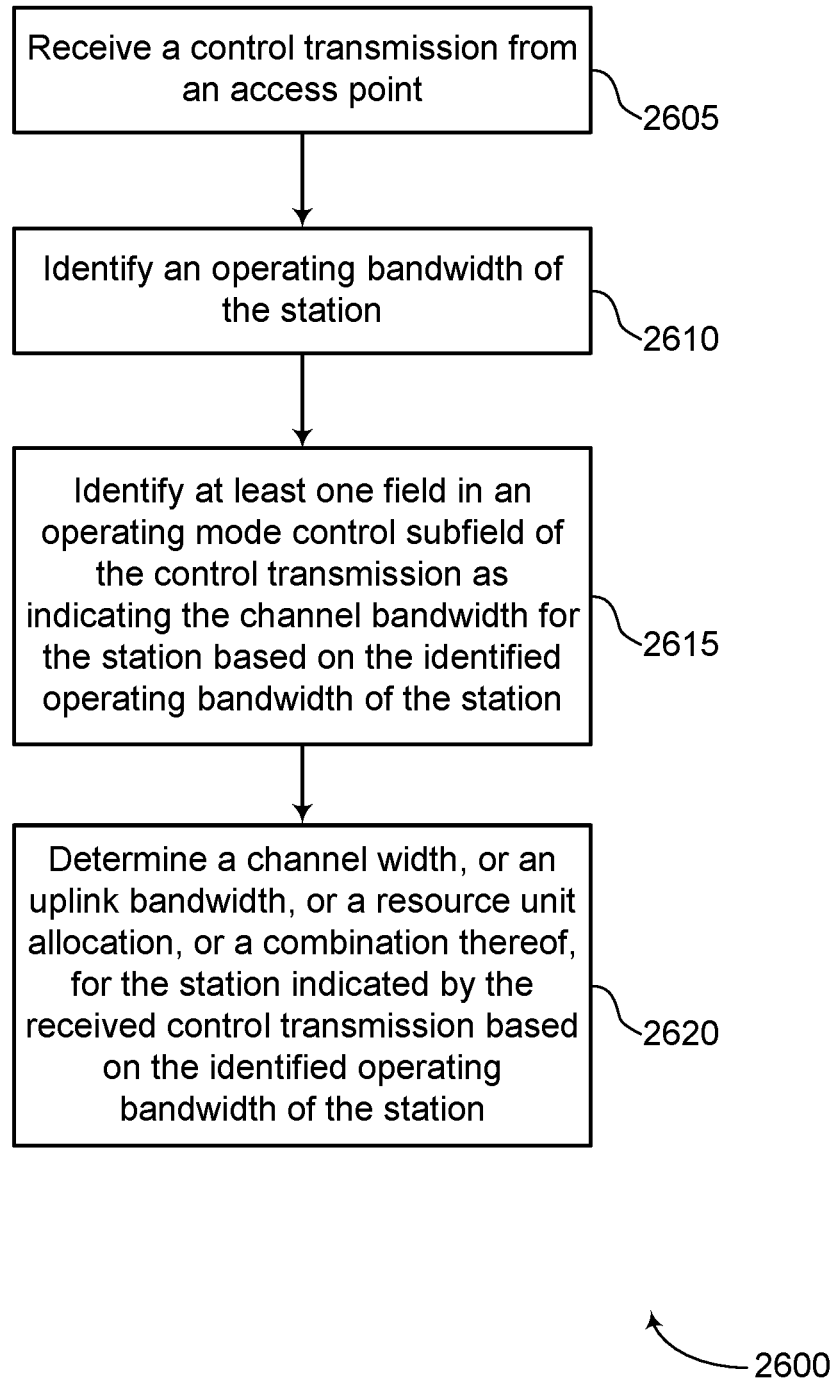

FIG. 26 shows a flowchart illustrating a method 2600 for use in wireless communication that supports a 320 MHz operating bandwidth in accordance with aspects of the present disclosure. The operations of method 2600 may be implemented by a STA or its components as described herein. For example, the operations of method 2600 may be performed by a communications manager as described in FIGS. 16-19. In some examples, a STA may execute a set of instructions to control the functional elements of the STA to perform the functions described below. Additionally or alternatively, a STA may perform aspects of the functions described below using special-purpose hardware.

At 2605, the STA may receive a control transmission from an access point. The operations of 2605 may be performed according to the methods described herein. In some examples, aspects of the operations of 2605 may be performed by a receiver as described in FIGS. 16-19.

At 2610, the STA may identify an operating bandwidth of the station. The operations of 2610 may be performed according to the methods described herein. In some examples, aspects of the operations of 2610 may be performed by an operating mode component as described in FIGS. 16-19.

At 2615, the STA may identify at least one field in an operating mode control subfield of the control transmission as indicating the channel bandwidth for the station based on the identified operating bandwidth of the station. The operations of 2615 may be performed according to the methods described herein. In some examples, aspects of the operations of 2615 may be performed by an OM control component as described in FIGS. 16-19.

At 2620, the STA may determine one or more of a channel width, or an uplink bandwidth, or a resource unit allocation, for the station indicated by the received control transmission based on the identified operating bandwidth of the station. The operations of 2620 may be performed according to the methods described herein. In some examples, aspects of the operations of 2620 may be performed by a control component as described in FIGS. 16-19.

Figure 27:
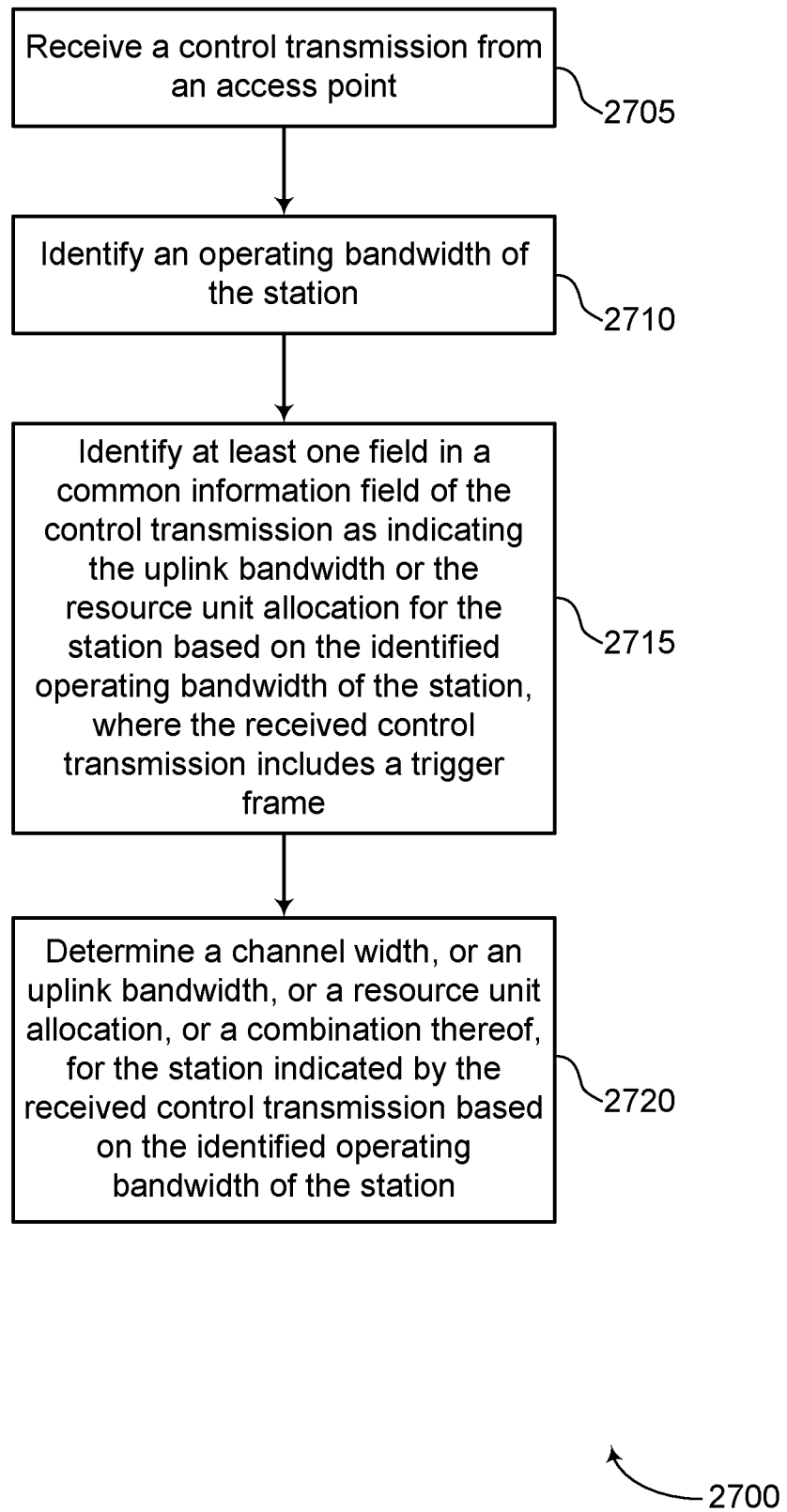

FIG. 27 shows a flowchart illustrating a method 2700 for use in wireless communication that supports a 320 MHz operating bandwidth in accordance with aspects of the present disclosure. The operations of method 2700 may be implemented by a STA or its components as described herein. For example, the operations of method 2700 may be performed by a communications manager as described in FIGS. 16-19. In some examples, a STA may execute a set of instructions to control the functional elements of the STA to perform the functions described below. Additionally or alternatively, a STA may perform aspects of the functions described below using special-purpose hardware.

At 2705, the STA may receive a control transmission from an access point. The operations of 2705 may be performed according to the methods described herein. In some examples, aspects of the operations of 2705 may be performed by a receiver as described in FIGS. 16-19.

At 2710, the STA may identify an operating bandwidth of the station. The operations of 2710 may be performed according to the methods described herein. In some examples, aspects of the operations of 2710 may be performed by an operating mode component as described in FIGS. 16-19.

At 2715, the STA may identify at least one field in a common information field of the control transmission as indicating the uplink bandwidth or the resource unit allocation for the station based on the identified operating bandwidth of the station, in which the received control transmission includes a trigger frame. The operations of 2715 may be performed according to the methods described herein. In some examples, aspects of the operations of 2715 may be performed by a trigger frame component as described in FIGS. 16-19.

At 2720, the STA may determine one or more of a channel width, or an uplink bandwidth, or a resource unit allocation, for the station indicated by the received control transmission based on the identified operating bandwidth of the station. The operations of 2720 may be performed according to the methods described herein. In some examples, aspects of the operations of 2720 may be performed by a control component as described in FIGS. 16-19.

It should be noted that the methods described above describe possible implementations, and that the operations and the various blocks or steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000 or Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (for example, several kilometers in radius) and may allow unrestricted access by UEs 115 with service subscriptions with the network provider. A small cell may be associated with a lower-powered base station 105, as compared with a macro cell, and a small cell may operate in the same or different (for example, licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (for example, a home) and may provide restricted access by UEs 115 having an association with the femto cell (for example, UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (for example, two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination designed to perform the functions described. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (such as A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an ASIC, a FPGA or other PLD, discrete gate or transistor logic, discrete hardware components, or any combination designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some examples, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. The claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems may be integrated together in a single software product or packaged into multiple software products.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable one skilled in the art to make or use the disclosure. Various modifications to the disclosure will be readily apparent to those skilled in the art, and the generic principles defined herein may be applied to other variations without departing from the scope of the disclosure. The disclosure is not limited to the examples and designs described herein, but is to be accorded the broadest scope consistent with the principles and novel features disclosed herein.

What is claimed is:

1. An apparatus for wireless communications at a station, comprising:
   a processor,
   memory coupled with the processor; and
   instructions stored in the memory and executable by the processor to cause the apparatus to:
      select, in accordance with an operating mode for an operating bandwidth of the station, a first value for a first parameter of a first target wake time (TWT) element and a second value for a second parameter of one of the first TWT element or a second TWT element, wherein the first parameter indicates a first bandwidth of at least 160 MHz and the second parameter indicates a second bandwidth, wherein the first bandwidth and the second bandwidth include different sub-channels of the operating bandwidth; and
      transmit a frame containing one or more TWT elements and an indication of the first value for the first parameter in the first TWT element and an indication of the second value for the second parameter in the one of the first TWT element or the second TWT element.

2. The apparatus of claim 1, wherein the instructions are further executable by the processor to cause the apparatus to receive a request for the frame containing the one or more TWT elements, wherein the frame is transmitted in response to the request.

3. The apparatus of claim 1, wherein the frame that contains the one or more TWT elements comprises an indication of a duration of time for which the first TWT element or the second TWT element is valid.

4. The apparatus of claim 3, wherein the indication of the duration of time indicates that the first TWT element or the second TWT element does not expire.

5. The apparatus of claim 3, wherein the first value for the first parameter of the first TWT element, or the second value of the second parameter of the second TWT element, or a combination thereof, are used to select a secondary sub-channel of the operating bandwidth of the station.

6. The apparatus of claim 1, wherein the first value for the first parameter of the first TWT element, or the second parameter of the second TWT element, or a combination thereof, comprise an indication of a duration of time that the different sub-channels of the operating bandwidth of the station are to be busy or are to be available.

7. The apparatus of claim 1, wherein a granularity of the indication in the frame that contains the one or more TWT elements is based at least in part on the operating bandwidth of the station, or a bandwidth supported by the station, or a bandwidth supported by a device receiving the frame that contains the one or more TWT elements, or a bandwidth specified by a request for the frame that contains the one or more TWT elements, or a bandwidth indicated in the frame that contains the one or more TWT elements, or a combination thereof.

8. The apparatus of claim 1, wherein the operating bandwidth of the station comprises 320 MHz, and the first TWT element is associated with a first portion of the operating bandwidth, and wherein the instructions are further executable by the processor to cause the apparatus to:
    determine, based at least in part on the operating mode, the second value for the second parameter of the second TWT element, wherein the second TWT element is associated with a second portion of the operating bandwidth; and
    transmit the second TWT element including the indication of the second value for the second parameter.

9. The apparatus of claim 1, wherein the instructions are further executable by the processor to cause the apparatus to:
    receive a control transmission from an access point, wherein the operating mode for the operating bandwidth of the station is associated with the control transmission; and
    determine a resource unit allocation for the station based at least in part on the operating bandwidth of the station.

10. The apparatus of claim 9, wherein the control transmission comprises a trigger frame, and at least one field in a common information field of the control transmission indicates an uplink bandwidth for the station that is associated with the operating bandwidth of the station or indicates the resource unit allocation for the station that is associated with the operating bandwidth of the station.

11. The apparatus of claim 1, wherein the operating bandwidth of the station comprises 320 MHz, and the operating mode is a 20 MHz operating mode, or a 40 MHz operating mode, or an 80 MHz operating mode, or an 80+80 MHz operating mode, or a 160 MHz operating mode, or a 320 MHz operating mode, or a 160+160 MHz operating mode.

12. The apparatus of claim 1, wherein the instructions are further executable by the processor to cause the apparatus to:
    identify that the station has data for transmission to an access point, wherein the access point supports communication on the different sub-channels of the operating bandwidth of the station; and
    monitor one or more network allocation vectors (NAVs) for respective ones of the different sub-channels of the operating bandwidth of the station; and
    maintain a timer for each NAV of the monitored one or more NAVs.

13. The apparatus of claim 12, wherein the instructions are further executable by the processor to cause the apparatus to:
    sense a medium for the different sub-channels after one or more NAV timers for the different sub-channels have expired; and
    transmit feedback for the one or more NAVs based at least in part on the sensing.

14. The apparatus of claim 1, wherein the operating bandwidth comprises one or more primary channels, the different sub-channels including the one or more primary channels.

15. A method for wireless communications at a station, comprising:
    select, in accordance with the an operating mode for an operating bandwidth of the station, a first value for a first parameter of a first target wake time (TWT) element and a second value for a second parameter of one of the first TWT element or a second TWT element, wherein the first parameter indicates a first bandwidth of at least 160 MHz and the second parameter indicates a second bandwidth, wherein the first bandwidth and the second bandwidth include different sub-channels of the operating bandwidth; and
    transmitting a frame containing one or more TWT elements and including an indication of the first value for the first parameter in the first TWT element and an indication of the second value for the second parameter in one of the first TWT element or the second TWT element.

16. The method of claim 15, further comprising:
    receiving a request for the frame containing the one or more TWT elements, wherein the frame is transmitted in response to the request.

17. The method of claim 15, wherein a transmitted frame that contains the one or more TWT elements comprises an indication of a duration of time for which the first TWT element or the second TWT element is valid.

18. The method of claim 17, wherein the indication of the duration of time indicates that the first TWT element or the second TWT element does not expire.

19. The method of claim 17, wherein the first value for the first parameter of the first TWT element, or the second value of the second parameter of the second TWT element, or a combination thereof, are used to select a secondary sub-channel of the operating bandwidth of the station.

20. The method of claim 15, wherein the first value for the first parameter of the first TWT element, or the second parameter of the second TWT element, or a combination thereof, comprise an indication of a duration of time that the different sub-channels of the operating bandwidth of the station are to be busy or are to be available.

21. The method of claim 15, wherein a granularity of the indication in the frame that contains the one or more TWT elements is based at least in part on the operating bandwidth of the station, or a bandwidth supported by the station, or a bandwidth supported by a device receiving the frame that contains the one or more TWT elements, or a bandwidth specified by a request for the frame that contains the one or more TWT elements, or a bandwidth indicated in the frame that contains the one or more TWT elements, or a combination thereof.

22. The method of claim 15, wherein the operating bandwidth of the station comprises 320 MHz, and the first TWT element is associated with a first portion of the operating bandwidth, the method further comprising:
determining, based at least in part on the operating mode, the second value for the second parameter of the second TWT element, wherein the second TWT element is associated with a second portion of the operating bandwidth; and
transmitting the second TWT element including the indication of the second value for the second parameter.

23. The method of claim 15, further comprising:
receiving a control transmission from an access point, wherein the selecting the operating mode for the operating bandwidth of the station is associated with the control transmission; and
selecting a resource unit allocation for the station based at least in part on the operating bandwidth of the station.

24. The method of claim 23, further comprising:
identifying at least one field in a common information field of the control transmission as indicating an uplink bandwidth or the resource unit allocation for the station based at least in part on the operating bandwidth of the station, wherein the control transmission comprises a trigger frame.

25. The method of claim 15, wherein the operating bandwidth of the station comprises 320 MHz, and the operating mode is a 20 MHz operating mode, or a 40 MHz operating mode, or an 80 MHz operating mode, or an 80+80 MHz operating mode, or a 160 MHz operating mode, or a 320 MHz operating mode, or a 160+160 MHz operating mode.

26. The method of claim 15, further comprising:
identifying that the station has data for transmission to an access point, wherein the access point supports communication on the different sub-channels of the operating bandwidth of the station;
monitoring one or more network allocation vectors (NAVs) for respective ones of the different sub-channels of the operating bandwidth of the station; and
maintaining a timer for each NAV of the monitored one or more NAVs.

27. The method of claim 26, further comprising:
sensing a medium for the different sub-channels after one or more NAV timers for the different sub-channels have expired; and
transmitting feedback for the one or more NAVs based at least in part on the sensing.

28. The method of claim 15, wherein the operating bandwidth includes one or more primary channels, the different sub-channels including the one or more primary channels.

29. An apparatus for wireless communications at a station, comprising:
means for selecting, in accordance with an operating mode for an operating bandwidth of the station, a first value for a first parameter of a target wake time (TWT) element and a second value for a second parameter of one of the first TWT element or a second TWT element, wherein the first parameter indicates a first bandwidth of at least 160 MHz and the second parameter indicates a second bandwidth, wherein the first bandwidth and the second bandwidth include different sub-channels of the operating bandwidth; and
means for transmitting a frame containing one or more TWT elements and including an indication of the first value for the first parameter in the first TWT element and an indication of the second value for the second parameter in one of the first TWT element or the second TWT element.

30. A non-transitory computer-readable medium storing code for wireless communications at a station, the code comprising instructions executable by a processor to:
select, in accordance with an operating mode for an operating bandwidth of the station, a first value for a first parameter of a target wake time (TWT) element and a second value for a second parameter of one of the first TWT element or a second TWT element, wherein the first parameter indicates a first bandwidth of at least 160 MHz and the second parameter indicates a second bandwidth, wherein the first bandwidth and the second bandwidth include different sub-channels of the operating bandwidth; and
transmit a frame containing one or more TWT elements and including an indication of the first value for the first parameter in the first TWT element and an indication of the second value for the second parameter in one of the first TWT element or the second TWT element.

* * * * *